US011799666B2

(12) United States Patent
Wentz et al.

(10) Patent No.: US 11,799,666 B2
(45) Date of Patent: *Oct. 24, 2023

(54) SYSTEMS AND METHODS AUTHENTICATING A DIGITALLY SIGNED ASSERTION USING VERIFIED EVALUATORS

(71) Applicant: Ares Technologies, Inc., Boston, MA (US)

(72) Inventors: Christian T. Wentz, San Francisco, CA (US); Ilia Lebedev, Cambridge, MA (US)

(73) Assignee: Ares Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,431

(22) Filed: Jan. 3, 2022

(65) Prior Publication Data

US 2022/0123948 A1    Apr. 21, 2022

Related U.S. Application Data

(63) Continuation of application No. 16/400,636, filed on May 1, 2019, now Pat. No. 11,218,324, which is a continuation-in-part of application No. 15/968,720, filed on May 1, 2018, now Pat. No. 10,320,569.

(60) Provisional application No. 62/758,367, filed on Nov. 9, 2018, provisional application No. 62/653,330, filed on Apr. 5, 2018.

(51) Int. Cl.
    *H04L 9/32*        (2006.01)

(52) U.S. Cl.
    CPC .......... *H04L 9/3247* (2013.01); *H04L 9/3228* (2013.01); *H04L 9/3265* (2013.01)

(58) Field of Classification Search
    CPC ........ H04L 9/3247; H04L 9/30; H04L 9/0643
    See application file for complete search history.

(56) References Cited

U.S. PATENT DOCUMENTS

| 9,584,517 B1 * | 2/2017 | Roth ................... G06F 21/6209 |
| 9,876,788 B1 * | 1/2018 | Ziraknejad .............. G06F 21/45 |
| 10,002,362 B1 * | 6/2018 | Endress ........... G06K 19/06037 |

(Continued)

OTHER PUBLICATIONS

Kravitz et al., "Transaction Immutability and Reputation Traceability: Blockchain as a Platform for Access Controlled IoT and Human Interactivity," 2017 15th Annual Conference on Privacy, Security and Trust (PST) Year: 2017.*

(Continued)

*Primary Examiner* — Roderick Tolentino
(74) *Attorney, Agent, or Firm* — CALDWELL INTELLECTUAL PROPERTY LAW

(57) ABSTRACT

A system for authenticating a requesting device using verified evaluators includes an authenticating device. The authenticating device is designed and configured to receive at least a first digitally signed assertion from a requesting device, the at least a first digitally signed assertion linked to at least a verification datum, evaluate at least a second digitally signed assertion, signed by at least a cryptographic evaluator, conferring a credential to the requesting device, validate the credential, as a function of the at least a second digitally signed assertion, and authenticate the requesting device based on the credential.

19 Claims, 6 Drawing Sheets

(56) References Cited

U.S. PATENT DOCUMENTS

| | | | | |
|---|---|---|---|---|
| 2009/0271618 A1* | 10/2009 | Camenisch | ............ | G06F 21/445 |
| | | | | 713/155 |
| 2009/0271625 A1* | 10/2009 | Kolluru | ................ | H04L 63/126 |
| | | | | 713/170 |
| 2013/0111549 A1* | 5/2013 | Sowatskey | .............. | H04L 63/08 |
| | | | | 726/3 |
| 2014/0173274 A1* | 6/2014 | Chen | ........................ | G06F 21/64 |
| | | | | 713/155 |
| 2014/0366111 A1* | 12/2014 | Sheller | .................... | G06F 21/31 |
| | | | | 726/7 |
| 2015/0128240 A1* | 5/2015 | Richards | ............... | H04W 12/06 |
| | | | | 726/7 |
| 2015/0256341 A1* | 9/2015 | Ye | .......................... | H04L 9/3234 |
| | | | | 713/164 |
| 2016/0294845 A1* | 10/2016 | Jackson | .............. | H04L 63/0823 |
| 2017/0178237 A1* | 6/2017 | Wong | ..................... | G06Q 20/12 |
| 2017/0249464 A1* | 8/2017 | Maximov | ............... | G06F 21/57 |
| 2018/0034642 A1* | 2/2018 | Kaehler | ............. | H04L 63/0442 |
| 2018/0089655 A1* | 3/2018 | Mcdonald | .......... | G06Q 20/3827 |

OTHER PUBLICATIONS

Chakravarty et al., "Blockchain-enhanced Identities for Secure Interaction," 2018 IEEE International Symposium on Technologies for Homeland Security (HST) Year: 2018.*

* cited by examiner

SYSTEMS AND METHODS AUTHENTICATING A DIGITALLY SIGNED ASSERTION USING VERIFIED EVALUATORS

CROSS-REFERENCE TO RELATED APPLICATIONS

This application is a continuation of U.S. Nonprovisional application Ser. No. 16/400,636, filed on May 1, 2019 and entitled "SYSTEMS AND METHODS AUTHENTICATING A DIGITALLY SIGNED ASSERTION USING VERIFIED EVALUATORS," which is a continuation-in-part of Non-provisional application Ser. No. 15/968,720 filed on May 1, 2018 and entitled "SYSTEMS AND METHODS FOR AUTHENTICATING A DIGITALLY SIGNED ASSERTION USING VERIFIED EVALUATORS," which claims priority to Provisional Application No. 62/653,330 filed on Apr. 5, 2018 and entitled "SYSTEMS AND METHODS FOR ENERGY AND TIME-EFFICIENT CRYPTOGRAPHIC IMMUTABLE LEDGER GENERATION AND AUTHENTICATION." The entirety of each of application Ser. No. 16/400,636, application Ser. No. 15/968,720, and Application No. 62/653,330 are incorporated herein by reference. This application further claims priority to Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

FIELD OF THE INVENTION

The present invention generally relates to the field of data storage and authentication in distributed computing systems. In particular, the present invention is directed to systems and methods for authenticating a digitally signed assertion using verified evaluators.

BACKGROUND

Distributed ledgers and related data storage techniques, such as block chain technology, have greatly improved the ability to track transactions and other data securely in a transparent and readily verifiable manner. Block chain technology, however, remains limited in its usefulness because of its inherently extensive demands on computing power; verification of chains of transactions via hashing and public key cryptographic algorithms, and creation of new entries on such chains by similar processes, uses many computing clock cycles, which in turn results in costly degrees of consumption of energy and sometimes in lengthy wait times. Solutions thus far have implicitly proposed trade-offs between security and efficiency, for instance by using expedited processes that review portions of chains on a heuristic basis, skipping or deferring until later the review of entire chains to ensure the integrity of the process. The high degree of certainty required for the ledgers, however, means that such tradeoffs are not optimal, and generally must be supplemented with the same expensive processes originally used.

SUMMARY OF THE DISCLOSURE

In an aspect, a method of authenticating a requesting device using verified evaluators includes receiving, by an authenticating device, at least a first digitally signed assertion from a requesting device, the at least a first digitally signed assertion linked to at least a verification datum. The method includes evaluating, by the authenticating device, at least a second digitally signed assertion, signed by at least a cryptographic evaluator, conferring a credential to the requesting device. The method includes validating, by the authenticating device, the credential as a function of the at least a second digitally signed assertion. The method includes authenticating, by the authenticating device, the requesting device based on the credential.

In another aspect, a system for authenticating a requesting device using verified evaluators includes an authenticating device, wherein the authenticating device is designed and configured to receive at least a first digitally signed assertion from a requesting device, the at least a first digitally signed assertion linked to at least a verification datum, evaluate at least a second digitally signed assertion, signed by at least a cryptographic evaluator, conferring a credential to the requesting device, validate the credential, as a function of the at least a second digitally signed assertion, and authenticate the requesting device based on the credential.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
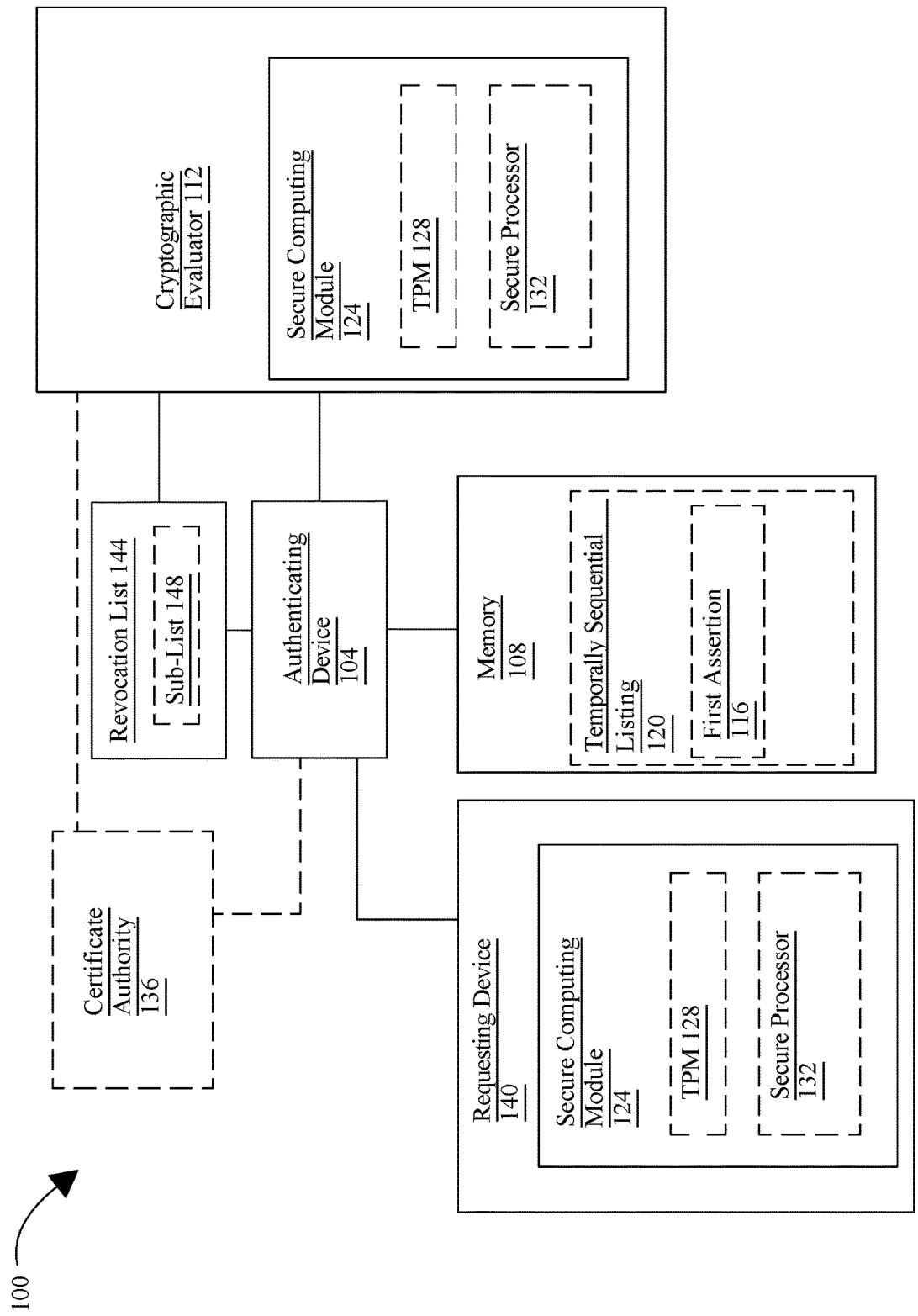
FIG. 1 is a block diagram illustrating an exemplary embodiment of a system for authenticating a digitally signed assertion using verified evaluators.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to improvements to architecture and processes for authentication of digitally signed assertions and files containing digitally signed assertions, including cryptographic immutable ledgers, such as block chains or the like. In an embodiment, methods for selecting evaluators, which may be members of a network sharing or accessing an immutable ledger, may include selection of a subset of possible evaluators to perform a more rapid authentication process than that presented by a purely consensus-based approach. Selection of evaluators to perform authentication may include identifying evaluators having proximity to a querying device so that authentication may occur more rapidly, as well as identifying evaluators that may be trusted according to one or more protocols for determining levels of trust.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein includes a secure proof of a secret data element as applied to a set of data; secure proof may be applied to a mathematical representation of a set of data such as, without limitation, a cryptographic hash, also known as a "hash," of the set of data. A cryptographic hash, as used in this disclosure, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A secure proof, as used in this disclosure, is a protocol whereby an output is generated that demonstrates possession of a secret, such as a secret stored in or produced by secure computing module and/or physically unclonable function (PUF) as described in further detail below, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

A secure proof may include a zero-knowledge proof. A zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively or additionally, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be, as a non-limiting example, 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. In an embodiment, zero-knowledge proof may include PCPs based on interleaved Reed-Solomon codes. Persons skilled in the art, upon reviewing the entirety of this disclosure, will be aware of various forms of zero-knowledge proofs that may be used, singly or in combination, consistently with this disclosure.

Secure proof may include be generated using a physically unclonable function and may utilize at least a random number generator (RNG), true random number generator (TRNG) or other source of entropy. For instance, and without limitation, an output of a PUF may be used to generate a private key for a digital signature as described above. Alternatively or additionally, a PUF output may constitute a secret to be used as a basis for a zero-knowledge proof, which may be any zero-knowledge proof as described herein.

A device performing a secure proof, including without limitation a cryptographic evaluator, requesting device, authenticating device, and/or any other device and/or component thereof as described in this disclosure, may generate one or more elements of additional information, which may be referred to herein as "verification data" that user or device may use to evaluate secure proof. For instance, a secure computing module and/or computing device may generate a public key; public key may be provided automatically to any querying device. Alternatively or additionally, public key may be provided to a manufacturer of a secure computing module and/or computing device, permitting manufacturer to act as a certificate authority for secure computing module and/or computing device. In an embodiment, public key may be generated using a recoverable key generation mechanism, as is described above for recoverable public/private key pairs via at least a PUF as described in further detail below. Similarly, a secure computing module and/or computing device may generate data necessary to perform verification of a zero-knowledge proof by any verifier as described above. Such a verification datum may be included in a token including a credential as described in further detail below, permitting a computing device and/or secure computing module to demonstrate its link to the token by providing a corresponding secure proof on demand.

Evaluating a secure proof may include receiving a verification datum corresponding to secure proof and evaluating the secure proof as a function of the verification datum. Verification datum, as used herein, is any datum that may be used to aid in evaluation of secure proof for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof. Secure proof and/or verification data may be included in authorization request; for instance, and without limitation, a computing device may transmit an authorization request including secure proof as part of a secure sockets layer communication or the like. Alternatively or additionally secure proof may function as or be a portion of a digital signature for a digitally signed assertion as described in further detail above. Evaluation of a digital signature may include evaluation of at least a secure proof included in the digital signature, as well as a set of data and/or mathematical representation of the set of data in the digital signature; evaluation may include comparison of mathematical representations to data they purport to represent.

As a non-limiting example, a digital signature may include an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. As a non-limiting example, a certificate authority may include any distributed certificate authority as described in this disclosure and/or any disclosure incorporated herein by reference. A certificate authority may, as a non-limiting example, post one or more credentials and/or authorization tokens to a temporally sequential listing as described in further detail below, indicating authentication and/or authorization of a device such as described below in further detail.

In an embodiment, a certificate authority may include a manufacturer of a device. For instance, a manufacturer may verify that a private key, or secret usable to produce a secure proof as set forth in further detail below, available to a device is associated with one or more devices produced by the manufacturer; verification may take the form of a digital signature created by the manufacturer, signing a verification datum and/or public key corresponding to the private key and/or secret belonging to the device. Private key and/or secret may be device-specific or may be issued to a group of devices; in the latter case, a device signing with private key and/or generating a secure proof based on secret may convey that it belongs to that group of devices, without making it possible for a device evaluating the signature and/or secure proof to identify the specific device. A group of devices so identified may have characteristics in common, such as instances and/or versions of hardware, firmware, or other elements, including without limitation secure computing modules as described in further detail below; identification that device is in group may, for instance, indicate that device may be trusted to a certain degree, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where a group has been compromised, given a lower confidence level, or the like, individual devices in group having device-specific secrets or private keys may sign transactions with such keys, sacrificing a degree of anonymity to differentiate themselves from compromised members of such groups. Group keys and/or secrets may be embedded in hardware of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group, but cannot determine which member of a group it is.

Referring now to FIG. 1, an exemplary embodiment of a system 100 for authenticating a digitally signed assertion using verified evaluators is illustrated. In an embodiment, system 100 includes an authenticating device 104. Authenticating device 104 may be any computing device or set of computing devices as described in this disclosure. Authenticating device 104 may include a single processor operating independently, or may include two or more processors operating in concert, in parallel, sequentially or the like; two or more processors may be included together in a single computing device or in two or more computing devices. Authenticating device 104 may be an element of, be in communication with, or otherwise utilize a secure computing module as described below in further detail. Authenticating device 104 may be or include a cryptographic evaluator as described below in further detail. Authenticating device 104 may include without limitation a microcontroller, microprocessor, digital signal processor (DSP) and/or system on a chip (SoC) as described in this disclosure. Authenticating device 104 may be housed with, may be incorporated in, or may incorporate one or more sensors of at least a sensor. Computing device may include, be included in, and/or communicate with a mobile device such as a mobile telephone or smartphone. Authenticating device 104 may include a single computing device operating independently, or may include two or more computing device operating in concert, in parallel, sequentially or the like; two or more computing devices may be included together in a single computing device or in two or more computing devices. Authenticating device 104 with one or more additional devices as described below in further detail via a network interface device. Network interface device may be utilized for connecting an authenticating device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Authenticating device 104 may include but is not limited to, for example, a first computing device or cluster of computing devices in a first location and a second computing device or cluster of computing devices in a second location. Authenticating device 104 may include one or more computing devices dedicated to data storage, security, distribution of traffic for load balancing, and the like. Authenticating device 104 may distribute one or more computing tasks as described below across a plurality of computing devices of computing device, which may operate in parallel, in series, redundantly, or in any other manner used for distribution of tasks or memory between computing devices. Authenticating device 104 may be implemented using a "shared nothing" architecture in which data is cached at the worker, in an embodiment, this may enable scalability of system 100 and/or computing device.

Still referring to FIG. 1, authenticating device 104 is coupled to a memory 108. Memory 108 may include any form of memory described in this disclosure. Memory 108 may be incorporated in a device containing authenticating device 104, distributed through several devices, which may contain authenticating device 104, or a component thereof, or in another device accessible to authenticating device 104 via electronic communication. Authenticating device 104 may be communicatively coupled to at least a cryptographic evaluator 112. Authenticating device 104 may be designed and configured to receive at least a first digitally signed assertion 116, assign at least a confidence level to the at least a cryptographic evaluator 112, provide the at least a digitally signed assertion 116 to the cryptographic evaluator, receive, from the at least a cryptographic evaluator 112, at least an appraisal of the at least a first digitally signed assertion 116, and authenticate the at least a first digitally signed assertion 116 as a function of the at least an appraisal and the at least a confidence level.

Figure 2:
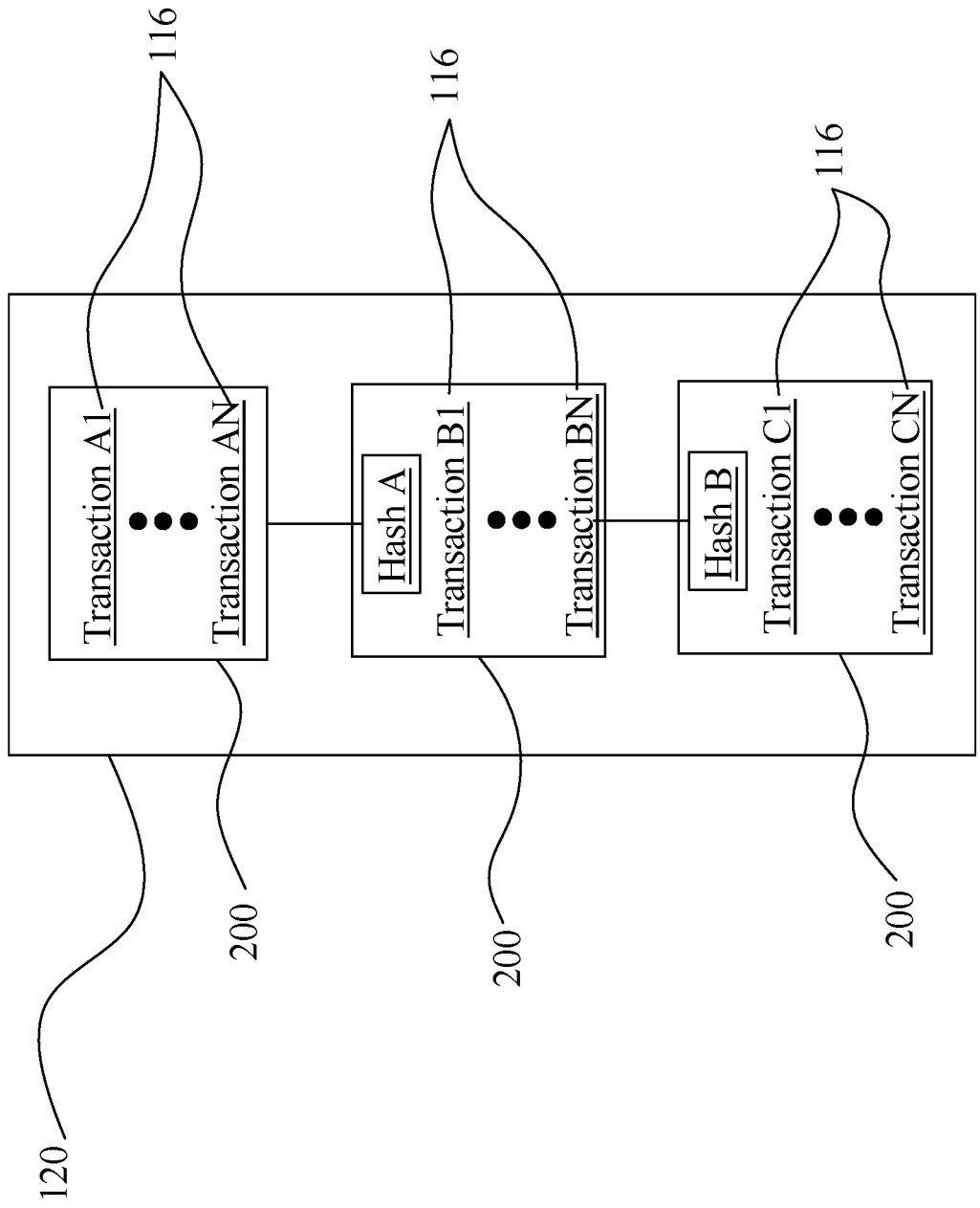
FIG. 2 is a block diagram illustrating an exemplary embodiment of a temporally sequential listing of digitally signed assertions.

Referring now to FIG. 2, system 100 may be used to perform one or more processing steps necessary to create, maintain, and/or authenticate a digitally signed assertion 116. In one embodiment, at least a digitally signed assertion 116 is a collection of textual data signed using a digital signature as described above. Collection of textual data may contain any textual data, including without limitation ASCII or ANSI data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion. In an embodiment, collection of textual data states that the owner of a certain transferable item represented in the at least a digitally signed assertion 116 register is transferring that item to the owner of an address. At least a digitally signed assertion 116 may be signed by a digital signature created using the private key associated with the owner's public key, as described above. For instance, at least a digitally signed assertion 116 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 116 may describe the transfer of a physical good; for instance, at least a digitally signed assertion 116 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 116 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 116. In some embodiments, address is linked to a public key, the corresponding private key of which is owned by the recipient of the at least a digitally signed assertion 116. For instance, address may be the public key. Address may be a representation, such as a hash, of the public key. Address may be linked to the public key in the memory 120 of a computing device, for instance via a "wallet shortener" protocol. Where address is linked to a public key, a transferee in the at least a digitally signed assertion 116 may record a subsequent at least a digitally signed assertion 116 transferring some or all of the value transferred in the first at least a digitally signed assertion 116 to a new address in the same manner. At least a digitally signed assertion 116 may contain textual information that is not a transfer of some item of value in addition to, or as an alternative to, such a transfer. For instance, as described in further detail below, at least a digitally signed assertion 116 may indicate a confidence level associated with a cryptographic evaluator as described in further detail below.

With continued reference to FIG. 2, at least a digitally signed assertion 116 may be included in a temporally sequential listing 120. Temporally sequential listing 120 may include any set of data used to record a series of at least a digitally signed assertion 116 in an inalterable format that permits authentication of such at least a digitally signed assertion 116. In some embodiments, temporally sequential listing 120 records a series of at least a digitally signed assertion 116 in a way that preserves the order in which the at least a digitally signed assertion 116 took place. Temporally sequential listing 120 may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Temporally sequential listing 120 may preserve the order in which the at least a digitally signed assertion 116 took place by listing them in chronological order; alternatively or additionally, temporally sequential listing 120 may organize digitally signed assertions 116 into sub-listings 200, such as "blocks" in a blockchain, which may be themselves collected in a temporally sequential order; digitally signed assertions 116 within a sub-listing 200 may or may not be temporally sequential. In an embodiment, temporally sequential listing may be a directed acyclic graph (DAG), in which multiple branches may be generated on or by different devices implementing temporally sequential listing 120, and branches may be merged into one another, while a hash chain or similar structure ensures that branches cannot go "back in time" whether merged or not; secure timestamps and/or attested time may be further included to impose a temporal order on a DAG or other temporally sequential listing 120. The ledger may preserve the order in which at least a digitally signed assertion 116 took place by listing them in sub-listings 200 and placing the sub-listings 200 in chronological order. Temporally sequential listing 120 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 116 to the ledger, but may not allow any users to alter at least a digitally signed assertion 116 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 120, once formed, cannot be altered by any party, no matter what access rights that party possesses. For instance, temporally sequential listing 120 may include a hash chain, in which data is added during a successive hashing process to ensure non-repudiation. Temporally sequential listing 120 may include a block chain. In one embodiment, a block chain is temporally sequential listing 120 that records one or more new at least a digitally signed assertion 116 in a data item known as a sub-listing 200 or "block." An example of a block chain is the BITCOIN block chain used to record BITCOIN transactions and values. Sub-listings 200 may be created in a way that places the sub-listings 200 in chronological order, and links each sub-listing 200 to a previous sub-listing 200 in the chronological order, so that any computing device may traverse the sub-listings 200 in reverse chronological order to verify any at least a digitally signed assertion 116 listed in the block chain. Each new sub-listing 200 may be required to contain a cryptographic hash describing the previous sub-listing 200. In some embodiments, the block chain contains a single first sub-listing 200, sometimes known as a "genesis block."

Still referring to FIG. 2, the creation of a new sub-listing 200 may be computationally expensive; for instance, the creation of a new sub-listing 200 may be designed by a "proof of work" protocol accepted by all participants in forming temporally sequential listing 120 to take a powerful set of computing devices a certain period of time to produce. Where one sub-listing 200 takes less time for a given set of computing devices to produce the sub-listing 200, protocol may adjust the algorithm to produce the next sub-listing 200 so that it will require more steps; where one sub-listing 200 takes more time for a given set of computing devices to produce the sub-listing 200, protocol may adjust the algorithm to produce the next sub-listing 200 so that it will require fewer steps. As an example, protocol may require a new sub-listing 200 to contain a cryptographic hash describing its contents; the cryptographic hash may be required to satisfy a mathematical condition, achieved by having the sub-listing 200 contain a number, called a nonce, whose value is determined after the fact by the discovery of the hash that satisfies the mathematical condition. Continuing the example, the protocol may be able to adjust the mathematical condition so that the discovery of the hash describing a sub-listing 200 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 200 according to the protocol is known as "mining." The creation of a new sub-listing 200 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 200. The incentive may be financial; for instance, successfully mining a new sub-listing 200 may result in the person or entity that mines the sub-listing 200 receiving a predetermined amount of currency. The currency may be fiat currency. Currency may be crypto currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 200. Each sub-listing 200 created in temporally sequential listing 120 may contain a record or at least a digitally signed assertion 116 describing one or more addresses that receive an incentive, such as virtual currency, as the result of successfully mining the sub-listing 200.

With continued reference to FIG. 2, where two entities simultaneously create new sub-listings 200, temporally sequential listing 120 may develop a fork; protocol may determine which of the two alternate branches in the fork is the valid new portion of the temporally sequential listing by evaluating, after a certain amount of time has passed, which branch is longer. "Length" may be measured according to the number of sub-listings 200 in the branch. Length may be measured according to the total computational cost of producing the branch. Protocol may treat only at least a digitally signed assertion 116 contained the valid branch as valid at least a digitally signed assertion 116. When a branch is found invalid according to this protocol, at least a digitally signed assertion 116 registered in that branch may be recreated in a new sub-listing 200 in the valid branch; the protocol may reject "double spending" at least a digitally signed assertion 116 that transfer the same virtual currency that another at least a digitally signed assertion 116 in the valid branch has already transferred. As a result, in some embodiments the creation of fraudulent at least a digitally signed assertion 116 requires the creation of a longer temporally sequential listing branch by the entity attempting the fraudulent at least a digitally signed assertion 116 than the branch being produced by the rest of the participants; as long as the entity creating the fraudulent at least a digitally signed assertion 116 is likely the only one with the incentive to create the branch containing the fraudulent at least a digitally signed assertion 116, the computational cost of the creation of that branch may be practically infeasible, guaranteeing the validity of all at least a digitally signed assertion 116 in the temporally sequential listing 120.

Still referring to FIG. 2, additional data linked to at least a digitally signed assertion 116 may be incorporated in sub-listings 200 in the temporally sequential listing 120; for instance, data may be incorporated in one or more fields recognized by block chain protocols that permit a person or computer forming a at least a digitally signed assertion 116 to insert additional data in the temporally sequential listing 120. In some embodiments, additional data is incorporated in an unspendable at least a digitally signed assertion 116 field. For instance, the data may be incorporated in an OP_RETURN within the BITCOIN block chain. In other embodiments, additional data is incorporated in one signature of a multi-signature at least a digitally signed assertion 116. In an embodiment, a multi-signature at least a digitally signed assertion 116 is a at least a digitally signed assertion 116 to two or more addresses. In some embodiments, the two or more addresses are hashed together to form a single address, which is signed in the digital signature of the at least a digitally signed assertion 116. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 116 are typical crypto-currency addresses, such as addresses linked to public keys as described above, while one or more additional addresses in the multi-signature at least a digitally signed assertion 116 contain additional data related to the at least a digitally signed assertion 116; for instance, the additional data may indicate the purpose of the at least a digitally signed assertion 116, aside from an exchange of virtual currency, such as the item for which the virtual currency was exchanged. In some embodiments, additional information may include network statistics for a given node of network, such as a cryptographic evaluator, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the at least a cryptographic evaluator 112) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 200 in a block chain computationally challenging; the incentive for producing sub-listings 200 may include the grant of new crypto currency to the miners. Quantities of crypto currency may be exchanged using at least a digitally signed assertion 116 as described above.

Still referring to FIG. 2, at least a digitally signed assertion 116 may be included data structures or memory elements besides a temporally sequential file, including without limitation any temporary or persistent memory as used in or by any computing device as described in this disclosure. For example, and without limitation, at least a digitally signed assertion 116 may include one or more encrypted or otherwise secured or partitioned memory entries as entered for instance using a secure computing module or according to a secure computing protocol as described in further detail below.

With continued reference to FIG. 2, in an embodiment at least a digitally signed assertion 116, temporally sequential listing 120 and/or one or more sub-listings 200 may be used to record an exchange of securities. A "security" as used herein may be a security that may be traded on stock exchanges, bond markets, commodities markets, futures contracts, options contracts, derivative financial instruments or the like, including without limitation an interest in a fungible bulk security (e.g. an equity security traded on exchanges are backed by paper securities enumerated in units of 100 shares, also known as a bulk security, with a result that trades not in whole groups of 100 actually represent an interest in a bulk security) or any other security as described above. Security may include, without limitation, a debt security, such as a bond, debenture, or other share or tranche of a debt; debt may include government debt, personal debt, commercial debt, or the like. Security may include, without limitation, an equity security, such as a share or portion of a share in common stock or premium stock, an ownership interest in a partnership or other business entity, or the like. Security may include, without limitation, an interest in a commodity or currency, or a derivative financial instrument.

Still referring to FIG. 2, in some embodiments an exchange of securities may be performed by listing each of a security to be purchased and a price to be paid for the security to be purchased in a temporally sequential listing 120. Price to be paid for security may include another security, an amount of virtual currency, and/or any other value, including without limitation fiat currency, interest in real property, or an ownership interest in any object or right having a demonstrable economic value. A digitally signed assertion indicating possession of either security or price to be paid for security may be entered on temporally sequential listing; each digitally signed assertion may be authenticated by any suitable process for authentication, including authentication as described below in reference to method 400 and/or consensus authentication. In an embodiment, a first digitally signed assertion is recorded on temporally sequential listing 120 asserting ownership of security by first party, and a second digitally signed assertion is recorded on temporally sequential listing 120 asserting ownership of price to be paid by a second party. The validity of each assertion may be attested to by an entity having an accepted authority to indicate possession of security and/or price; for instance, and without limitation, a digitally signed assertion may be created by an entity issuing the security, such as a corporate entity issuing an equity or debt security to a purchaser, wherein digitally signed assertion is signed by a device that may be demonstrated as possessed by the entity issuing the security. In further example, a digitally signed assertion may be created by an entity such as a custodial agent, securities clearing house or depository trust. In a non-limiting example, a digitally signed assertion may represent the creation of a digital instance of a security previously existing as a paper certificate, in non-limiting example a fungible bulk security or interest therein. Additionally or alternatively, a digitally signed assertion may transfer some or all of a security that currently only exists as a paper stock certificate; for instance and without limitation, a trusted and/or non-anonymous entity, such as a custodian service provider, a depository trust company, or the like may sign digitally assigned assertion using a computing device that may be identified using a secure computing module, a certificate authority, and/or a threshold cryptographic protocol as described above. Digitally signed assertion may sign security to possessing party by signing an assertion listing an address belonging to possessing party as described above. Similarly, second or purchasing party may possess or receive a digitally signed assertion establishing second party's ownership of price to be paid.

With continued reference to FIG. 2, a commitment in the form of at least a third digitally signed assertion may be created or recorded in temporally sequential listing 120. At least a third digitally signed assertion may include an assertion signed by first party transferring security to second party, and a digitally signed assertion signed by second party transferring security to first party; this may be performed by having each of first and second party sign a single assertion indicating transfer of the security and transfer of the price to be paid, or two separate assertions, a first indicating transfer of the security and a second indicating transfer of the price to be paid. In the latter case, each of two assertions making up at least a third assertion may reference the other assertion, or may reference both the security and the price to be paid. In an embodiment, recording of at least a third digitally signed assertion may form a "commitment" stage of an exchange of securities. In an embodiment, at least a third digitally signed assertion may include additional assertions performing a "netting" process, whereby one or more central counterparties first purchase each of security and price to be paid from first and second parties, for instance by recording digitally signed assertions exchanging value as described above, and then perform exchange of security and price in an additional set of digitally signed assertions. In an embodiment, central counterparties may be entities having high levels of trust and/or collateral; for instance, each central counterparty may have previously recorded digitally signed assertions indicating possession of an amount of value capable of offsetting values of security and/or price to be paid, and may record digitally signed assertions indicating that such previously recorded digitally signed assertions may be applied to price either of security or of price to be paid in the event of a failed transaction. In an embodiment, a collection of counterparties may act in coordination through a mechanism of threshold endorsement, such as without limitation a threshold cryptographic process as described above. For instance, for a given financial risk, any one counterparty may not have sufficient levels of trust and/or collateral, however the total financial risk may be covered by having a threshold number of central counterparties assert, for instance via additional digitally signed assertions, that they will participate in the transaction by making reference to the at least a third digitally signed assertion.

Still referring to FIG. 2, a clearing process may be performed to ensure that the trade is valid; clearing may include authentication of an instance of temporally sequential listing 120 containing first assertion, second assertion, at least a third assertion, and any additional assertions such as assertions entered by one or more central counterparties. Authentication may include any authentication process suitable for authentication of a temporally sequential listing 120, including without limitation any authentication process described below in reference to FIG. 4. Authentication may further involve additional checks of identity of entities involved, including first entity, second entity, and/or central counterparties. In an embodiment, central counterparties may act in a non-anonymous manner; i.e. central counterparties may record their identities in temporally sequential listing 120 or otherwise make their identities public. First party and/or second party may be anonymous; in an embodiment, central counterparties may increase collateral amounts to account for anonymity. First party and/or second party may also be identified by machine identities using, e.g., certificate authorities and/or secure computing modules 124 incorporated in computing devices possessed by each of first party and/or second party. Authentication and/or clearing may include review or assessment of previous transactions performed by either of first party or second party to establish a degree of trust in first party and/or second party; degree of trust may be used to set collateral amounts, where a lower degree of trust corresponds to a higher collateral amount. Review or assessment of degree of trust may include, in non-limiting examples, relative weighting of attested trust elements within a "chain of trust"; for instance, depending upon the contemplated threat vectors to which a cryptographic evaluator is subject, degree of trust assigned may heavily weight attestation of the hardware manufacturer(s), the code operating on the device, the trusted time of the device, the trusted nature of the device memory, or other attestable attributes of the device.

Still referring to FIG. 2, security exchange may conclude with settlement, where settlement is an exchange of security for price to be paid. In an embodiment, settlement is concluded upon authentication of instance of temporally sequential listing 120 recording first assertion, second assertion, and at least a third assertion; instance may also include any central counterparty assertions. In an embodiment, one or more assertions may be required to utilize multi-party assertion, e.g. a threshold number of verifiers may be required to authenticate in order for the assertion to be valid. In an embodiment, settlement may involve additional steps, such as inspection or validation of temporally sequential listing 120 by a governmental, quasi-governmental, or agreed-upon commercial authority; authentication may be suspended until inspection is completed, preventing distribution of and/or reliance on instance of temporally sequential listing 120 until inspection is complete.

With continued reference to FIG. 2, in an embodiment at least a digitally signed assertion 116, temporally sequential listing 120 and/or one or more sub-listings 200 may be used to record wire transfer. A wire transfer, as used herein, may be an electronic transfer of monetary value from a first user to a second user. First user and/or second user may be a person or an entity such as a business entity, trust, club, or other organization. In an embodiment, wire transfer may be performed as follows: a first digitally signed assertion may be entered on an instance of temporally sequential listing 120 transferring an item of property to first user; item of property may be anything to which a monetary value maybe ascribed. Item of property may include, e.g., money from an electronic account in fiat currency or virtual currency. Item of property may include an item of property may include an ownership interest in a tangible good. Item of property may include an ownership interest in a parcel of real property. Item of interest may include an ownership interest in an item of intellectual property. First digitally signed assertion may, as a non-limiting example, transfer the item of property to an address belonging to first user. A second digitally signed assertion may then be entered transferring item of property from first user to second user; item of property may, for instance, be transferred to an address belonging to second user. In an embodiment, first digitally signed assertion may be authenticated with a first instance of temporally sequential file 120 prior to subsequent entry of a second digitally signed assertion, or in other words the first digitally signed assertion may be recorded in a first block which is authenticated, prior to entry in a second, subsequent block, of the second digitally signed assertion; alternatively, where an entity signing the first digitally signed assertion is a highly trusted entity, first digitally signed assertion may be trusted as well, permitting authentication of first digitally signed assertion and second digitally signed assertion in a single block. Determination that entity signing first digitally signed assertion may be performed by combining a determination of confidence level as described below with an association of the device performing the signing to the entity performing the signing. As a non-limiting example entity performing the signing may be a bank or other financial institution, a wire transfer retail company, or any other entity that frequently performs such transactions, and may be identified as such on temporally sequential listing 120, a network connecting one or more cryptographic evaluators, or the like; as a result, entity performing the signing may be held accountable for failed transactions or double transactions. Entity performing the signing may be linked to device performing the signing by a certificate authority, which may be any certificate authority as described above. Alternatively or additionally, entity performing the signing may be linked to device by transaction history in temporally sequential listing 120. For instance, temporally sequential listing 120 may contain a plurality of similar transactions performed by device, indicating a course of business conducted by device. In an embodiment the use of trust levels may thus substantially improve authentication wire transfer; this improvement may be further realized by more rapid authentication as described below in reference to FIG. 4.

Still viewing FIG. 2, in the above-described example the wire transfer may be a person-person or person-entity transfer; first entity may be a person or user not affiliated with signing entity. Wire transfer may also be entity-entity, for instance between two banks, financial institutions, wire transfer retailers or the like. In an embodiment signing entity and first entity may be the same. For instance, an institution in the business of wire transfers may use first digitally signed assertion to convey one or more items of property to itself in temporally sequential listing 120. Alternatively, first transaction may directly sign property to second institution; possession of property by first institution may be assumed based on highly trusted status as described above. An additional assertion from second user/second institution to an end user or institution may further be performed; alternatively or additionally, after transfer is complete transferred value may be spent as virtual currency. In some embodiments, transfer may follow a real-time gross settlement protocol in which the entire amount to be transferred is transferred in a single transaction; first, second, and/or third assertions may be focused on transferring amounts for a single transaction. In an embodiment, first, second, and/or third digitally signed assertion may convey more than one item of property to more than one user; for instance, wire transfer may follow a periodic net settlement protocol wherein multiple transactions are simultaneously performed, typically found in institution-institution transfers. In that case, a series of potential institution-institution transfers may be planned by one or more institutions, the net sum to be transferred from one institution to the other may be calculated, and the calculated net sum may be transferred. Persons skilled in the art, upon reviewing the entirety of this disclosure, will be aware of multiple variations on the above methods and protocols that may be used to perform wire transfers consistently with this disclosure.

Continuing to refer to FIG. 2, in an embodiment temporally sequential listing 120, sub-listings 200 and/or digitally signed assertions may be used to support mobile payment processes and systems, including payments transacted through social media, messaging clients, text messaging, email services or other communication services. In an embodiment, mobile payment is a process or system whereby a user can pay for goods or services by transferring data from a mobile computing device. Mobile computing device may include any computing device carried on the person of a user, including without limitation a tablet, music playing device, cellular phone, digital phone, smartphone, wearable computing device, smart watch or the like. Mobile computing device may contain any element as described below for any computing device as described in this disclosure. In an embodiment, value may be transferred from mobile device by any means for transferring data from a mobile device to another device; such means may include without limitation wireless communication via pairing, near-field communication, contactless data transfer, or the like, or display and scanning of visual codes such as quick-read (QR) codes. Mobile pay process may transfer value by such means based, for instance, on credit card numbers or bank account numbers; such numbers may be provided securely using a tokenization process such as without limitation EMV tokenization as provided by EMVCo, LLC of Foster City, Calif. In an embodiment, a digital wallet containing an element of cryptocurrency may be provided on mobile computing device; element of cryptocurrency may include, without limitation, a private key corresponding to an address or other public key belonging to paying user. In an embodiment, a digitally signed assertion may be entered on temporally sequential listing 120 or an instance thereof transferring some amount of currency or other value to user; instance of temporally sequential listing 120 may be authenticated according to methods described below. Alternatively or additionally, where device signing digitally signed assertion is highly trusted as described above, only digitally signed assertion may be authenticated; it may be assumed, for instance, which should instance of temporally sequential listing 120 be "beaten" to authentication by another instance, a highly trusted entity operating a highly trusted device may re-post digitally signed assertion. In an embodiment, use of confidence levels to authenticate assertion and/or temporally sequential listing 120 may enable rapid transfer of funds to user's mobile wallet on demand; this may increase speed and security of payment processes.

With continued reference to FIG. 2, in an embodiment, temporally sequential listing 120 may be used to add security and speed to credit card transactions. A credit card transaction may be a transaction wherein a person or entity presents a set of data identifying an account such as a rolling credit line or bank account in the name of the person or entity, and agrees to permit a payment for a good, service, commodity, bill, or other item from the account, and (in the case of a rolling credit account) agrees to pay the balance according to terms arranged with an institution proffering the account; the institution may be a bank or other financial institution. Credit card payments may suffer from certain drawbacks that arise from their flexibility and ease of use. One such drawback is that they rely upon a user's promise to pay; this imposes a cost on the credit card payment system, as institutions offering credit card accounts must assume the risk of non-payment. That risk in turn is mitigated by charging a cardholder (the person able to draw payments against the account as described above) a high interest rate for carried balances, and by charging merchants and others receiving credit card payments a transaction fee. This may be mitigated by funding or offsetting credit card transactions with digitally signed assertions in the name of the user of the credit card, the assertions including a value to offset or otherwise secure credit card payments. Each credit card transaction may alternatively or additionally be memorialized in a digitally signed assertion entered on temporally sequential listing 120. This may establish a secure, transparent audit chain indicating which transactions have taken place using a given credit card number. In an embodiment, transactions may be recorded using a hash of one or more identifying data elements pertaining to credit card account, including without limitation a credit card number, expiration date, security code, and/or pin (where credit card is used with the "chip and pin" transaction protocol or the like).

Still viewing FIG. 2, in an embodiment temporally sequential listing 120 and/or digitally signed assertions may be used to secure and/or securely distribute medical data. Medical data as used herein may include patient data such as data recorded during medical treatment and diagnosis, data gathered concerning a patient using medical diagnostic equipment and/or medical implants or monitors, and data used to operate implants, monitors, or other devices used for diagnosis, treatment or alleviation of patients' conditions. Medical data may include software or firmware used to operate medical equipment, including without limitation implants, monitors, or other devices used for diagnosis, treatment or alleviation of patients' conditions. Medical devices may include "consumer" devices that directly or indirectly track physiological parameters and are available without a physician, such as activity trackers, heart rate monitors, glucose measurement devices, continuous glucose monitors and the like. As a non-limiting example, medical devices have become enabled with wireless capabilities allowing data migration to and from the device inside or attached to the body and other entities such as a patients care team, manufacturer or third-party data analysis firm. Data migration occurs with wireless radiofrequency from wires in the body to a wire circuitry outside of the body.

With continued reference to FIG. 2, medical devices may include wearable devices that are not implanted but are used by doctors to monitor a patients biological normal and abnormal functions. An example of this may be an external cardiac defibrillator which monitors a person's heart rate and above or below a selected threshold administers a potentially life-saving defibrillator shock of a chosen energy as therapy to resume a normal heart rate and rhythm in the event the person goes into a potentially fatal arrhythmia. When this occurs, data may be transmitted via a home monitor that is given with the device. Data may also be transmitted at the discretion of the patient should different alarms occur signaling a potentially disruptive arrhythmia. Implantable medical devices have become enabled with capabilities to monitor physiological changes in the body which may be used to study normal and abnormal events in the body or to trigger a therapeutic response necessary for the health of the person with the implanted device. Examples of medical devices enabled to perform therapeutic stimulation actions may include implantable cardiac devices, implantable pacemakers, Implantable nerve stimulators including spinal cord stimulators, sacral nerve stimulators, vagal nerve stimulators, trigeminal nerve stimulators, deep brain stimulators or other active neuromodulation devices, vision prosthetics, robotic limb prosthetics, bladder stimulators, diaphragm stimulators, cochlear implants and other active implantable medical devices. Therapeutic drug delivery may also be done via implantable medical device. Temporary and permanent diagnostic implants may be used to monitory important health markers. Medical devices may be enabled with wireless capabilities allowing data migration to and from the device inside or attached to the body and other entities such as a patients care team, manufacturer or third-party data analysis firm. Data migration may occur with wireless radiofrequency from wires in the body to a wire circuitry outside of the body or other means of data migration.

Still viewing FIG. 2, data migration may occur from the medical device implanted in the patient via wireless communication. Data may be received and recorded by the receiving party without the patient viewing and or reviewing such data. This may give rise to questions concerning data ownership; the patient may not have full control over who is using and collecting data. Data migration may occur from the patient to the patient care team at regularly scheduled intervals and when the health is compromised. The data in an implantable cardiac defibrillator may transmit heart rate, electrocardiogram (EKG), abnormal bouts of arrhythmias including ventricular fibrillation, tachycardia, and when shock therapy has been administered. Resistance data may also be collected to determine fluid retention in or around the heart and/or the device. Data may be collected via a manufacturer's compatible device used to collect the data wirelessly. This data may include inertial sensors, networks (BLE, Wi-Fi, Zigbee, or other), GPS, temperature, inference of position, altitude, movement, activity, and the like. Other examples of sensitive data transmission that may use the authentication process described herein include glucose readings from a stand-alone continuous glucose monitor (CGM) or transmission and authentication of data from CGM sensor element to actuator element (e.g. insulin pump) in a closed loop device, and other closed loop medical devices. The data may then be analyzed by the physician or care team member and a summary may be provided to the patient. Once again, the data ownership may be in question as the patient may not be able to decide when and to who the data can be given. The patient also may not be able to get the downloaded raw data to view. In most cases events that are not felt may not be discovered until much later leaving the patient with no clues as to inputs to the arrhythmia. Data migration may occur from the manufacturer to the patient's device via firmware updates which may occur at night when the probability that the patient is near the home monitoring system is higher. The patient may typically be unaware of any data migration to the device and the origin or persons responsible. Patient may also not be privy to downloads or content of the downloads. If asked, patients may be denied access and sent back to their doctors who only provide the summary.

Continuing to view FIG. 2, security of data migration between implant and doctors and manufacturers has become an opportunity for data hacking, especially since end patient has no ability to protect or even see the data being transmitted or collected. In some embodiments, security of data may be ensured by access control using one or more digitally signed assertions. For instance, and without limitation, a medical device such as a patient implant may be programmed, including via hardware programming, to accept only data that is digitally signed using a private key linked to a public key that medical device has recorded. Firmware/software updates and/or data supplied to medical device may be recorded and conveyed as a series of digitally signed assertions signed with the required private key. Such assertions may be recorded in temporally sequential listing 120. Data received from medical devices may similarly be signed by a private key stored or hardcoded on medical device; hardcoding may be implemented according to any form of secure computing module, or any process using or used by secure computing module, as described below. Medical records may be stored in encrypted form as well; in an embodiment, transfer of encrypted medical records encrypted with a first public key associated with a first private key may be performed in a three-step process: (1) encryption with a second public key associated with a second private key belonging to the recipient, (2) decryption using the first private key, and (3) entry of a digitally signed assertion signed with the first private key and transferring access to the owner of the second private key, by reference to second public key. This protocol may ensure that medical records always remain encrypted and viewable only to persons authorized to view them, with authority transferred concurrently with assertions indicating granting of permission; moreover, where digitally signed assertions are recorded in temporally sequential listing 120, a history of transfers of access rights may be created in a transparent and readily traceable form.

Referring again to FIG. 1, at least a cryptographic evaluator 112 may include an element incorporated in a computing device or set of computing devices incorporating authenticating device 104; for instance at least a cryptographic evaluator 112 may function as a secure computing module or secure computing environment utilized by or in conjunction with authenticating device 104, as described in further detail below. At least a cryptographic evaluator 112 may alternatively or additionally include or be included in one or more devices external to devices including authenticating device 104. For instance, at least a cryptographic evaluator 112 may include one or more devices connected to authenticating device 104 via a network, which may include without limitation the Internet or a sub-network thereof; network may alternatively or additionally include one or more intranets belonging to one or more institutions, one or more extranets, one or more protected networks such as virtual private networks or the like, or any other network that may occur to a person skilled in the art upon reading the entirety of this disclosure.

With continued reference to FIG. 1, at least a cryptographic evaluator 112 may include a secure computing module 124. As used herein, a secure computing module 124 is a hardware element configured to perform one or more secured operations beyond the control of other circuit elements or software, whether incorporated with the secure computing module 124 in a circuit or computing device, or a part of an extrinsic computing device. As a result, at least one secured operation performed by secure computing module 124 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 124 and/or a system or computing device incorporating secure computing module 124 based on the above-described set of assumptions. As a non-limiting, example, a secure computing module designed to produce an expected result despite all software-only attacks may give rise to a first confidence level, whereas another secure computing module designed to produce its expected result in the face of all software or hardware attacks may give rise to a second confidence level; the second confidence level may be higher, owing to the reduced probability that the second secure computing module would be compromised.

Still viewing FIG. 1, secure computing module 124 may include a trusted platform module (TPM) 128. In an embodiment, a TPM 128 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 128 may have any suitable elements of digital or analog circuitry usable to perform one or more processes as described herein, including without limitation processes used to determine confidence levels and/or authenticate digitally signed assertions as described below. TPM 128 may have memory and/or other logic and/or a processor in its own right which may be in a non-limiting example a crypto processor. TPM 128 may have a hard-coded process for signing a digital signature, which may be performed as described above using a secret, such as a private key, which is associated with a verification datum, such as a public key. This private key and/or signing process may be produced using a genuinely random process during manufacturing, and/or unique object (UNO) fingerprint, and/or a PUF, or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, TPM 128 may include circuitry to generate one or more asymmetric key pairs according to a public key cryptosystem as described above, and/or to sign a digital circuit. TPM 128 may include one or more tamper-proofing designs or components to prevent reverse-engineering; for instance, and without limitation, TPM 128 may include metastable elements, such that it is not possible to predict the circuit behavior from a plan of the circuit, without electrically probing the circuit; one or more instances or subsections of the circuit may be disposed within a three-dimensional chip in a form that makes it infeasible to probe with drilling and/or thinning via chemical-mechanical polishing, grinding, etching or the like, or slicing the chip, and so arrayed that drilling and/or slicing and/or thinning via chemical-mechanical polishing, grinding, etching or the like will destroy the circuit sufficiently to make the PK impossible to recover. Random and/or physically unclonable functions may be used by the cryptoprocessor in the TPM 128 to ensure that the manufacturer furthermore has no way of predicting how subsequent key-pairs can be generated. The TPM 128 may be used for a DAA as disclosed in further detail below. TTP may be implemented using any PKI system/asymmetrical system as described above, including without limitation RSA and elliptic curve PKI systems.

Still referring to FIG. 1, one or more TPMs 128 or subcomponents thereof, such as a PUF as described in further detail below, key extractor, key storage memory, may be integrated directly into the integrated circuit (IC), e.g. in non-limiting examples as contiguous functional block within the 3D space of the IC, and/or with fingers interdigitating other logic blocks in the IC, and/or as multiple distinct functional blocks wired together electrically, such that it is infeasible to electrically probe the outputs of the key extractor via man in the middle or other attacks. More than one computing circuit, memory storage element or other logic function of at least a cryptographic evaluator 112 may incorporate a TPM 128 or its subcomponents, such that all or subsets of computing circuits of at least a cryptographic evaluator 112 may authenticate each other as trusted components, in order to preserve the trusted nature of all of subsets of the computing, memory storage, network interface and other logic functions of the at least a cryptographic evaluator 112.

Still viewing FIG. 1, secure computing module may include at least a PUF. Secure computing module 124 may employ PUF and associated circuitry without a TPM, or in addition to a TPM. Secure computing module 124, with or without TPM, may include one or more separate integrated circuits; one or more separate integrated circuits may instantiate one or more PUFs and associated circuitry to generate upon request a private hardware key incorporated therein. In an embodiment, one or more PUFs generate a random number seed of a private key. PUFs may be implemented in a variety of ways, e.g. by designing a series of circuits that are unstable in their exact outputs and depend on the physical randomness of the silicon during fabrication. PUFs, when properly designed, which requires knowledge of semiconductor physics as well as circuit design, may be so unstable that it would be infeasible to know their output even if an attacker knew the circuit design and manufacturing details fully. PUFs may also be fabricated in such a way that any attempt to probe or physically deconstruct the device causes its destruction, making spoofing attempts infeasible to even the most sophisticated state-sponsored actor. A PUF-generated private key and the circuitry needed to query/respond in Direct Anonymous Attestation (DAA) may be incorporated into every part of secure computing module 124 and/or a system incorporating secure computing module 124. The result may be that chips or ICs so designed and placed within a device can themselves verify all the other chips in the device are legitimate, obfuscating physical access man-in-the-middle attacks.

Continuing to view FIG. 1, PUFs may be implemented in secure computing module 124 and/or TPM by various means. In an embodiment, PUF 120 includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photomultipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radiofrequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 120 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 120 in an embodiment include without limitation buskeeper PUFs, which may be similar to other PUFs based on bistable memory elements but leveraging buskeeper cells. PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 120 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations, and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 120 may include a circuit implementing a quantum PUF. A quantum PUF, as used herein, is a PUF that generates secrets, such as random numbers, which are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations, Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PLC's, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 120 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency, irregularities may create variable reflective and/or refractive responses to a pulse of light, which may include, as a non-limiting example, a pulse in the femtosecond to atto-second range, such as, for illustrative purposes only, a 175-femtosecond pulse from a model-locked laser having a 90-MHz repetition rate, Fabrication may include incorporation of the light source. In operation, Optical output waveforms may also be complex and highly sensitive to precise physical cavity, structure; at the same time responses may remain highly repeatable. Continuing the example, ultra-short optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 120 that may be used may include, without limitation, nano electro-mechanical (NEM) PUFs. NEM PUFs may include PUFs that leverage stiction of a silicon nanowire to a binary gate structure. NEM PUFs may include those based on interfacial magnetic anisotropy enemy, such as use of the random distribution of magnetization orientation originating from the sub-nanometer variation of oxide layer produced the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchhoff-law-Johnson-noise (KUN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 120 and/or TPM 128; such outputs may be used to generate symmetric or asymmetric keys, private keys, zero-knowledge proofs, or other proofs of authenticity, as described in further detail below.

Still viewing FIG. 1, a secure protocol stack may be built on secure root established using PUFs and/or ICs incorporating PUFs. Secure protocol stack may be deployed as a layer-2 scaling solution on top of existing temporally sequential listings 120 such as blockchains, distributed ledgers, its own chain, or any other data storage structure. Protocol may define multiple trust levels for nodes, such as cryptographic evaluators 112, in a decentralized network. Nodes with secure computing modules 124 as disclosed herein, may be considered trusted nodes by protocol; protocol may allow for multiple trust levels as versions of hardware and software are released, including opportunities for other manufacturers to deploy hardware, and such trust levels may contribute to calculations of confidence levels as described in further detail below. Trusted nodes, or other devices incorporating secure computing modules 124 as described herein, may be able to authenticate each other anonymously and without a trusted third party. As a non-limiting example, a network elected trusted node, analogous to the Accelerator node in other protocols, (or series of nodes) may maintain a register of trusted nodes. This register may itself be distributed across all nodes or a subset of nodes in a blockchain, distributed ledger, or other data storage mechanism. Protocol may allow for varying levels of decentralization of this trusted register depending on application. For instance, and without limitation, a securities settlement platform, for example to engage in securities exchanges as described above, may be far more centralized than a more open-source cryptocurrency system. For backwards compatibility with existing hardware, nodes in the network may utilize any hardware infrastructure; formal verification methods may be used to establish the "trust level" of any node, these formal methods be defined or approved by the protocol in the case of a decentralized open network; as a non-limiting example nodes implementing Ares trusted node architecture may be assigned a higher trust level than Intel SGX based hardware, which may be assigned a higher trust level above completely unsigned hardware; various different implementations of secure computing module 124 may be assigned different trust levels. In a heterogeneous network consisting of devices of differing trust levels, the network may adopt a "hybrid consensus" protocol, in which proof of work and/or proof of stake is hybridized with block signatures from trusted nodes.

Continuing to refer to FIG. 1, secure computing module 124 may implement one or more secure memory storage protocols. One or more secure memory storage protocols may be protocols designed to prevent unauthorized access to memory and/or to protect secure computing module 124 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally unfeasible for exterior computing elements to probe, manipulate, access, or otherwise interact with elements under control of or incorporated in secure computing module 124. For instance and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 124 may incorporate a memory controller located within the trusted computing boundary to encrypt and authenticate by a secret key memory elements such as without limitation memory page tables and/or memory pages accessible by other software elements, such as an operating system. Various techniques, processes, means or elements may be used to implement the above-described secure memory protocols. For instance, secure computing module 124 may use hardware-enabled access control to protect memory access; hardware access control may, as a non-limiting example, be performed by tagging each memory entry with a "container identifier" corresponding to a page, file, or other grouping of memory, enabling secure computing module 124 to determine whether tampering has occurred.

Still referring to FIG. 1, secure computing module 124 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 124 may operate using one or more dedicated memory objects, registers, or storage elements; as a non-limiting example, secure computing module 124 may operate with dedicated cache lines not available to other processes or circuits, preventing, e.g., stack or buffer overrun attacks to corrupt or steal data. Dedicated memory elements may be wired only to secure computing module 124; access to dedicated memory elements may be rendered impossible except by way of secure computing module 124. Secure computing module 124 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described above, including without limitation blockchains and the like. Secure computing module 124 may utilize oblivious random-access memory (RAM) wherein memory access patterns are obfuscated to prevent detection of memory access patterns by outside observers attempting to deduce execution details regarding processes performed using secure computing module 124. Secure computing module 124 and/or device incorporating secure computing module 124 may incorporate a trusted non-volatile storage device that provides some means of verification of secure storage capability and other properties. Memory protocols as described above may be used to implement methods of attested storage and the chain of trust beginning at PUF level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing modules 124.

Still referring to FIG. 1, secure computing module 124 may include a secure processor 132. Secure processor 132 may be a processor as described in this disclosure. Secure processor 132 may operate autonomously from other processors and/or an operating system operating on at least a cryptographic evaluator; for instance, secure processor 132 may store entries in temporary or long-term memory in encrypted form, where decryption is impossible without private keys not available to devices, circuits or software besides secure processor 132. Encryption may likewise, alternatively, or additionally be impossible without private keys available only to secure processor 132. Secure processor 132 may also digitally sign memory entries using, for instance, a private key available only to secure processor 132. Keys available only to secure processor 132 may include keys directly encoded in hardware of the secure processor 132; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 132. Secure processor 132 may be constructed, similarly to TPM 128, to frustrate alteration and/or probing to discover and/or alter private keys. Private keys may be demonstrable as uniquely associated with secure processor 132 by use of PUF as described above; secure processor 132 may include, for instance, a TPM 128 as described above. Alternatively or additionally, a certificate authority as described above, which may be a manufacturer of secure processor 132, may verify that one or more public keys are associated uniquely with secure processor 132 according to any protocol suitable for digital certificates.

With continued reference to FIG. 1, secure computing module 124 may perform and/or follow one or more attestation protocols. Attestation, as used herein, may be a process whereby a remote device and/or user may verify the identity of a secure computing module 124 and/or a cryptographic evaluator 112 incorporating the secure computing module 124. Attestation processes may authenticate secure computing module 125 and/or cryptographic evaluator 112. Attestation may further provide verified program execution, whereby a remote device and/or user may be assured that a specified program has executed with specified inputs and produced specified outputs. In an embodiment, this is accomplished by (a) "measuring" memory contents of memory including program instructions and/or inputs by creating a cryptographic hash of those contents; (b) storage of the hash in a trusted location such as a trusted register, memory of a third-party device operated by a trusted entity, a temporally sequential listing as described above, including without limitation a blockchain, or other trusted memory that may occur to persons skilled in the art upon reviewing the entirety of this disclosure; (c) execution of the code, as preserved in the above-described hash; and/or (d) digitally signing the hash using a non-volatile signing key embedded in the secure computing module 124.

With continued reference to FIG. 1, secure computing module 124 may implement one or more methods of attested computation. Attested computation may include or involve one or more methods to ensure that computation of a program, known as an attested program, is trusted and signed by secure computing module 124 and/or computing device incorporating secure computing module 124; this may be supported by means to assert the state of the system memory, code, and input data. In an embodiment, attested computing may include or involve one or more methods to authenticate a boot loader. An authenticated boot loader may include a first code that the secure computing module 124 may run upon system initialization and is responsible for checking the measurements and/or signatures of subsequent components either locally or by utilizing a piece of trusted hardware such as a TPM 128. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric key based upon the trusted software component's hash. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, and still referring to FIG. 1, secure computing module 124 and/or a computing device incorporating secure computing module 124 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 124 and/or computing device incorporating secure computing module 124 may append a cryptographic signature based upon any private key that may be associated with secure computing module 124 as described herein. Secure computing module 124 and/or computing device incorporating secure computing module 124 may operate a security reset of working memory prior to load of data for trusted computation; for instance, the secure computing module 124 and/or computing device incorporating secure computing module 124 may append a hash of the memory to cryptographic hash of system state following reset and prior to loading data. Secure computing module 124 and/or computing device incorporating secure computing module 124 may append its authentication signature of memory page tables and/or memory tables. Upon completion of the trusted computation, which may include execution of program code of system state, secure computing module 124 and/or computing device incorporating secure computing module 124 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 124. Secure computing module 124 and/or computing device incorporating secure computing module 124 may include a system to compute one or more hash trees of cryptographic hash of the computation, system state, and/or outputs; secure computing module 124 and/or computing device incorporating secure computing module 124 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of a secure computing module 124 may include, without limitation, TPM 128 as described above. The secure computing module 124 may include TPM 128 combined with a boot-measuring protocol using hash trees, Merkle trees, or the like to measure boot entries to create an "attested boot," additionally or separately from the attested computation description described above. A secure computing module 124 may include a trusted execution technology (TXT) module combining a TPM 128 with establishment of a secure container at run-time; secure container may be isolated from a software stack and OS of at least the transaction authentication node 104 and/or use TPM 128 to measure and attest to secure container prior to launch. Secure computing module 124 may implement a trusted enclave, also known as a trusted execution environment (TEE). In an embodiment, a trusted enclave may be a portion of a computing device that is isolated from the main processor of the computing device. Isolation may be achieved using elements of secure computing module 124 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 124 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. RISC V architecture, including without limitation sanctum processors, Ascend secure infrastructure, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 124, TEE, or trusted enclaves as disclosed herein. System 100 may incorporate or communicate with a certificate authority.

In some embodiments, the secure computing module may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules, man in the middle or other attacks. Similarly, authentication of GPS coordinates, geolocation information and/or any other sensor information may be performed via co-authentication, concurrent or sequential authentication within a given period or time, for instance using any steps or analogous methods described for assignment of and performance of authentication steps by one or more devices in system 100 below. In non-limiting example, authentication of geospatial location may incorporate the random selection of one or more neighboring devices to attest their geospatial location, time of geospatial location sensing, and/or other parameters conferring confirmatory or denial at least a datum. In some embodiments, changes in inferred physical distance or latency between nodes in the graph may be used to flag potentially compromised secure computing module 124, man in the middle or other attacks.

Still referring to FIG. 1, a secure computing module 124 may be used to create and/or generate a digital signature. In an embodiment, digital signature may be any digital signature as described above; digital signature may be created by signing a mathematical representation of first dataset. In an embodiment, a computing device, which may include without limitation any computing device as described in this disclosure, may generate a key to be used in producing digital signature using secure computing module 124. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment a computing device and/or secure computing module 124 may convert immediate output from PUF into key in the form of a binary number. In non-limiting example, PUF may utilize at least a TRNG or other entropy source to provision an N bit secret vectors that is hashed via a cryptographic one-way function, in non-limiting example SHA256, SHA3 or the like, to create a seed for a key derivation function (KDF), in non-limiting example ED25519, generating at least a public/private key pair. At least a PUF 120 may, in a non-limiting example, output an M bit vector $\vec{e}$ (or a subset of PUF 120 output is truncated, multiple PUF outputs may be concatenated, or any combination thereof) which, combined with a public M×N bit matrix A and potentially public helper vector $\vec{b}$ satisfies the equation $\vec{b} = A\vec{s} + \vec{e}$. such that PUF output $\vec{e}$ and public helper data $\vec{b}$ and matrix A may be used to regenerate at least a secret $\vec{s}$. In an embodiment, bits of $\vec{e}$ that may be considered unstable or otherwise undesirable for purposes or stable regeneration may be discarded, resulting in associated reduction in length of $\vec{b}$ and A. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Extraction may include extraction of a symmetric key; for instance, a computing device and/or secure computing module 124 may extract one or more random numbers based on a PUF output to create a symmetric key as described above. Alternatively or additionally, extraction may include extraction of a private key of a public key cryptographic system.

Still referring to FIG. 1, key extraction may include use of a number output by a PUF or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF; steps along a chosen elliptic curve may then be performed using random number to generate a public key. Initial point on elliptic curve and elliptic curve may be selected using an additional random number, which may be generated using any suitable method; random numbers associated with curves having known vulnerabilities may be discarded, according to mathematical descriptors or other characteristics of such vulnerabilities as stored in memory of or accessible to a computing device and/or secure computing module 124. Persons skilled in the art, upon reading the entirety of this disclosure, will be aware of various ways in which a random number may be used to generate a private and public key pair consistently with this disclosure.

Still viewing FIG. 1, key extraction may utilize a numerical output from a PUF 120 or other element of secure computing module 124 to generate an RSA private key or other private or symmetric public key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF and/or elements of secure computing module 124 may generate one or more random numbers, for instance by using one or more PUFs as described above; any suitable algorithm may be used for generating a prime from a random number to produce pairs of primes usable as RSA factors or other random numbers, public/private key, symmetric public key or the like. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Hellman or ElGamal that are based on the discrete logarithm problem.

Continuing to view FIG. 1, digital signature may be generated using a digital signature using a direct anonymous attestation protocol (DAA). In an embodiment, DAA is an anonymous digital signature scheme, which instead of reliance on a certificate authority to link a particular private key to a particular party, uses reference to a group public key or to multiple public keys to verify an anonymous signature. A secure computing module 124 may act as a "first signer" of a digital signature, signing with a private key produced from a secret generator as described above, which may be a group key. In an embodiment secure computing module 124 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by secure computing module 124 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like. Direct anonymous attestation as used herein may alternatively or additionally refer to related methods such as in nonlimiting example anonymous hardware attestation, in which an attestation is performed in zero knowledge using a delegable credential. Such anonymous hardware attestation may utilize signature schemes using delegable credentials such as mercurial signatures. Such a signature scheme may allow a secure computing module 124 to perform a digital signature in such a matter that at least a verification may be made that the at least a signature is authentic without being able to determine that a particular secure computing module 124 was the signer. Non-limiting examples of delegable and mercurial signatures are presented in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference.

With continued reference to FIG. 1, secure proof may include be generated using a physically unclonable function and may utilize at least a random number generator (RNG), true random number generator (TRNG) or other source of entropy. For instance, and without limitation, an output of a PUF may be used to generate a private key for a digital signature as described above. Alternatively or additionally, a PUF output may constitute a secret to be used as a basis for a zero-knowledge proof, which may be any zero-knowledge proof as described herein.

Still viewing FIG. 1, trusted computing, secure computing module 124 and/or protocols using secure computing module 124 may be used to establish a unique but anonymous electronic identity container to provide user control over online data. One of the current business models of web search engines, social media platforms and other internet businesses is to provide a service (search, social media, shopping platform) in exchange for the collection of user data which is then sold in near-instantaneous ad targeting exchanges to advertisers in a competitive bidding process, the process may include the targeting of ads and collection and storage of the browsing person's metadata. Advertisers and other websites may use cookies and related technologies to obtain and track additional metadata of the user (e.g. shopping and browsing trends), this data being used to further optimize targeting of advertisement for goods and services. In an embodiment, a trusted hardware device, such as without limitation a secure computing module 124, incorporated into or associated with a device utilized for browsing a web page, interaction with a social media network, and any other web browsing may be used to instantiate an identity container. In a non-limiting example, the identity container is an electronic record structure that includes one or more public attestation keys of the trusted hardware device as used in an anonymity preserving attestation scheme, e.g. in non-limiting example a direct anonymous attestation procedure as described in further detail below in reference to FIG. 4. A method using identity container may establish in non-limiting example one or more permissioned and revocable access levels to the user's metadata contained in the identity container. In a non-limiting example, the identity container may be stored on the trusted hardware device and may be provisioned to one or more intermediates by exchange of public/private keys. Similarly, identity container may enable user to allow advertisers, web services or other entities to bid on access to one or more permissioned access levels of the identity container and the contents enclosed. In non-limiting example, by analogy to existing web advertisement bidding systems, the user may provide conditional access to one or more intermediate parties; the one or more intermediate parties may be composed of one or more entities. Provision may be accomplished by means of e.g. threshold cryptographic methods, such that it is infeasible for the intermediate party to maliciously leak the conditionally accessed data. Such data may further be obfuscated by a variety of means in a conditional exchange stage, such that the relative value of the metadata may be ascertained to some degree of certainty, but the actual metadata is not accessible. Intermediate party may facilitate a bid on access to one or more permissioned levels of the user's identity container and the enclosed metadata. Depending upon the value established by said metadata and other factors, which may include features such as the user's minimum percentage of revenue share, the bid is concluded, and the user's percentage revenue share is assigned to the user. This system and method may further be used to transfer to an anonymous but uniquely identifiable user the revenue obtained in a bid for user's metadata. In non-limiting example, the user may associate a cryptocurrency or other bank account directly or via third party to the unique identifier. In an embodiment, this process may function in a manner analogous to browser cookies, identity pixels and other technologies that are established from web service to user as a means to track and obtain metadata about that user. A mechanism may be established whereby the user may browse otherwise anonymously, but grant permissioned and revocable access to a container enclosing both the metadata they wish to provide (e.g. demographics, location, etc.), as well as data the web service or services may wish to associate with the user (e.g., shopping history).

Figure 3:
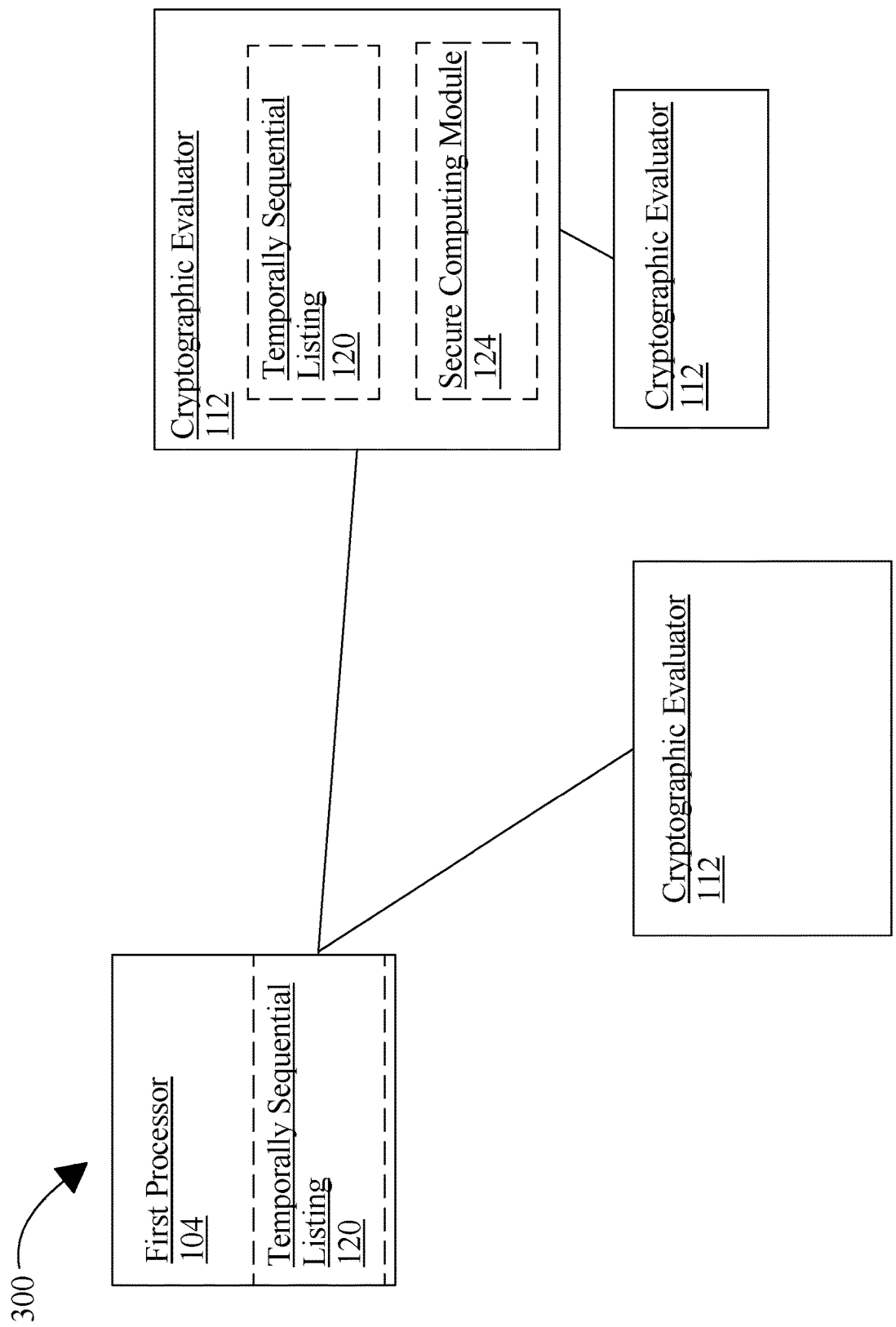
FIG. 3 is a block diagram of an exemplary embodiment of a network for authenticating a digitally signed assertion using verified evaluators.

Referring now to FIG. 3, one or more steps in forming, modifying, recording transactions in, and authenticating cryptographically signed assertions, temporally sequential listing 120, or one or more sub-listings 200 may be performed by a network 300 of cryptographic evaluators 112. Each cryptographic evaluator may be designed and configured to participate in, or practice one or more processes described herein for creation, modification, and/or authentication of temporally sequential listing 120, portions or sub-listings 200 thereof, and/or transactions. Network 300 may be connected, and information may be distributed throughout network 300, in any suitable way. As a non-limiting example, may be a centralized network, where all nodes in the network, including without limitation all cryptographic evaluators 112, send their data to and receive their data from, a central node (i.e. a server), so that communications by all non-central nodes are mediated by or through the central node. As a further non-limiting example, network 300 may be a distributed network wherein each node may be connected to and communicate with any other node; nodes not directly connected may transmit messages to and from one another via intermediate nodes, for instance by "hopping" messages from one node to another. Network 300 may include a decentralized network, having a plurality of local centralized nodes that connect to one another, such that "non-centralized" nodes connect only via local centralized nodes, or connections between locally centralized nodes. Network 300 may include a "federated" network. Persons skilled in the art, upon reviewing the entirety of this disclosure, will be aware of various forms and/or configurations network 300 may take consistently with the disclosed systems and methods.

With continued reference to FIG. 3, in an embodiment, temporally sequential listing 120 is copied or provided in its entirety to each at least a cryptographic evaluator 112. Alternatively or additionally, temporally sequential listing 120 may be copied to some cryptographic evaluators 112 but not to others; for instance, where the temporally sequential listing 120 is a block chain or a consensus ledger created for exchanges of virtual currency or other commercial exchanges, the temporally sequential listing 120 may be copied to all cryptographic evaluators 112 participating in such exchanges. In other embodiments still, various components of temporally sequential listing 120 are distributed to various computing devices, such as the cryptographic evaluators 112 in a network. In other embodiments still, subcomponents of complete temporally sequential listing 120 are distributed to various computing devices in a network 300, such that a group of computing devices such as the cryptographic evaluators 112 may each have a copy of the same subcomponent, and in totality, all subcomponents making up the complete temporally sequential listing 120 are contained in the network 300. Distribution of devices having a copy of the same subcomponent of temporally sequential listing 120 may be optimized locally in network graph space and/or geographical space, for example as described in further detail below. Where temporally sequential listing 120 is centralized, computing devices that do not possess a copy of the temporally sequential listing 120 may obtain information from and convey information to the temporally sequential listing 120 by communicating with the computing device or set of computing devices on which the centralized temporally sequential listing 120 is maintained. Where temporally sequential listing 120 is decentralized and multiple copies of the entire temporally sequential listing 120 are distributed to multiple computing devices, computing devices that do not possess a copy of the temporally sequential listing 120 may obtain information from and convey information to a copy of the temporally sequential listing 120 residing on a computing device that does have a copy; requests for information and changes to the temporally sequential listing 120 may be propagated to all other computing devices having copies of the temporally sequential listing 120. In some embodiments, the algorithm selecting the initial computing device with which to communicate may follow protocols as described in further detail below in reference to FIG. 4.

Still viewing FIG. 3, authenticating device 104 may be connected to network 300. In an embodiment, an authenticating device 104 may be one of cryptographic evaluators 112 in network 300. Authenticating device 104 may store locally an instance of temporally sequential listing 120 to be authenticated by one or more cryptographic evaluators 112. Alternatively or additionally, authenticating device 104 may be referring to an instance of temporally sequential listing 120 stored on one or more cryptographic evaluators 112; authenticating device 104 may not itself be at least a cryptographic evaluator 112.

Still referring to FIG. 3, systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of liability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance, a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

Referring again to FIG. 1, system 100 may include and/or communicate with a requesting device 140 as described in further detail below. Requesting device 140 may include any computing device or devices suitable for use as authenticating device 104 and/or cryptographic evaluators 112 as described above. As a non-limiting example, requesting device 140 may include any element of secure computing hardware or software as described above, including without limitation a secure computing module 124, TPM 128, secure processor 132, and/or circuits for generation of PUFs, secure proofs, key extraction, or the like. Requesting device 140 may be configured to perform any step of any method as disclosed in this disclosure, in any degree of repetition and in any order.

Still referring to FIG. 1, system 100 and/or elements of system 100 may include and/or communicate with a revocation list 144. Revocation list 144 may include, implement, and/or be included in any data structure as described in this disclosure, including in materials incorporated by reference. Revocation list 144 may, as a non-limiting example, include and/or be included in a temporally sequential listing 120 as described above. Revocation list 144 may be included in a temporally sequential listing 120 including credentials or the like as described in this disclosure or may be included in a separate temporally sequential listing. Revocation list 144 may be distributed to one or more devices in system 100; entire copies of revocation list 144 may be distributed, and/or portions thereof may be distributed according to any suitable distributed storage technique, such as without limitation distributed hash tables. Persons skilled in the art, upon reviewing the entirety of this disclosure, will be aware of various ways in which revocation list 144 may be implemented, distributed, and/or stored consistently with this disclosure.

In an embodiment, and continuing to refer to FIG. 1, revocation list includes a listing of verification data, device identifiers, or the like that are not currently authorized to participate in system 100 and/or to possess a credential. For instance, where a device, such as a cryptographic evaluator 112 or authenticating device 104 determines that a verification datum and/or credential as described in further detail below is being used by a device that has performed a malicious act, such verification datum and/or credential may be posted to revocation list 144, for instance by generating and posting a digitally signed assertion, as described above in reference to FIG. 2, indicating that credential and/or a set of credentials conferred on verification datum, is or are revoked. Verification datum may be associated with a group key, a specific device, a lot of manufactured devices, or the like. Thus, and as described in further detail below, a device evaluating revocation list 144, including without limitation authenticating device 104, may not authenticate a device proffering or otherwise related to a verification datum listed in revocation list 144.

In an embodiment, and still referring to FIG. 1, revocation list may include one or more sub-lists 148; each sub-list 148 may include a subset of the total data contained in the revocation list. A sub-list 148 may include a lot of revocation assertions that represent a common element and/or pattern of data. For instance, and without limitation, a sub-set 148 may include only digitally signed assertions describing revocations recorded during a particular period of time or "epoch." In an embodiment, where revocation list includes or is included in a temporally sequential listing, sub-lists 148 may be organized in sub-listings 200, where the sub-listings form a temporal sequence; sub-listings 200 may be formed to cover particular epoch of time, which may be an epoch of time used with credentials as described below. Likewise, a sub-list 148 may correspond to a lot or set of credentials as described in further detail below.

Continuing to refer to FIG. 1, revocation list 144 and/or entries thereon may include one or more levels of revocation. For instance, a given device or set of devices may be on revocation list for failure to meet one or more security protocol requirements, but may not be associated with suspicious and/or malicious activity; such devices and/or sets of devices may be removed from revocation list, and/or may have a posting indicating removal placed on revocation list 114, where such devices, e.g., pass a secondary authentication process as described below. Other devices and/or sets of devices may be associated with malicious and/or suspicious behavior, including without limitation misrepresentation of geographic or other contextual data, attempts to spoof other devices, attempted or successful cyber-crimes, or the like; such devices and/or sets thereof may be permanently banned from system 100. A flag indicative of a level of severity of revocation may be included in a posting to revocation list 144. Alternatively or additionally, revocation list 144 may include a sub-list 148 containing severe revocations, such as a sub-list 148 for devices associated with malicious and/or suspicious activity.

Still referring to FIG. 1, revocation list 144 may be updated continuously and/or periodically; for instance, when any cryptographic evaluator 112 and/or authenticating device 104 determines that a requesting device 140 and/or a set of devices associated with an identifier, credential, and/or verification datum as described in this disclosure, has performed a malicious or suspicious activity, failed to meet a threshold for confidence level, or the like, such cryptographic evaluator 112 and/or authenticating device 104 may post such a conclusion, and/or the credential, verification datum, and/or a device identifier to revocation list 144. Posting may include posting to a sub-list 148 associated with the relevant device or set of devices as described above.

Figure 5:
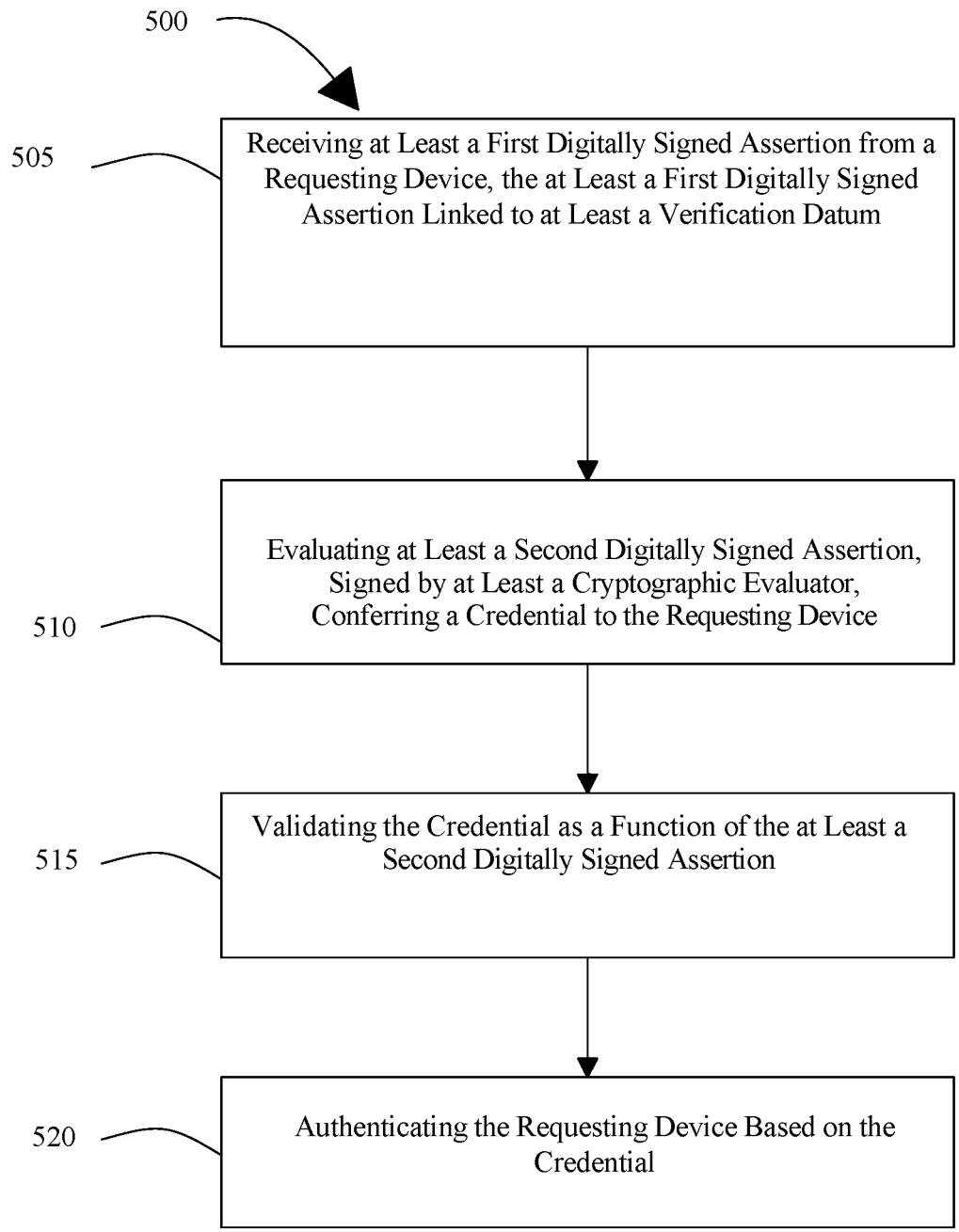
FIG. 5 is a flow diagram illustrating an exemplary method of authenticating a requesting device using verified evaluators.

Still referring to FIG. 1, authenticating device 104 may be designed and configured to receive at least a first digitally signed assertion from a requesting device, the at least a first digitally signed assertion linked to at least a verification datum, evaluate at least a second digitally signed assertion, signed by at least a cryptographic evaluator, conferring a credential to the requesting device, validate the credential, as a function of the at least a second digitally signed assertion, and authenticate the requesting device based on the credential, for instance as described in further detail below in reference to FIG. 5.

Figure 4:
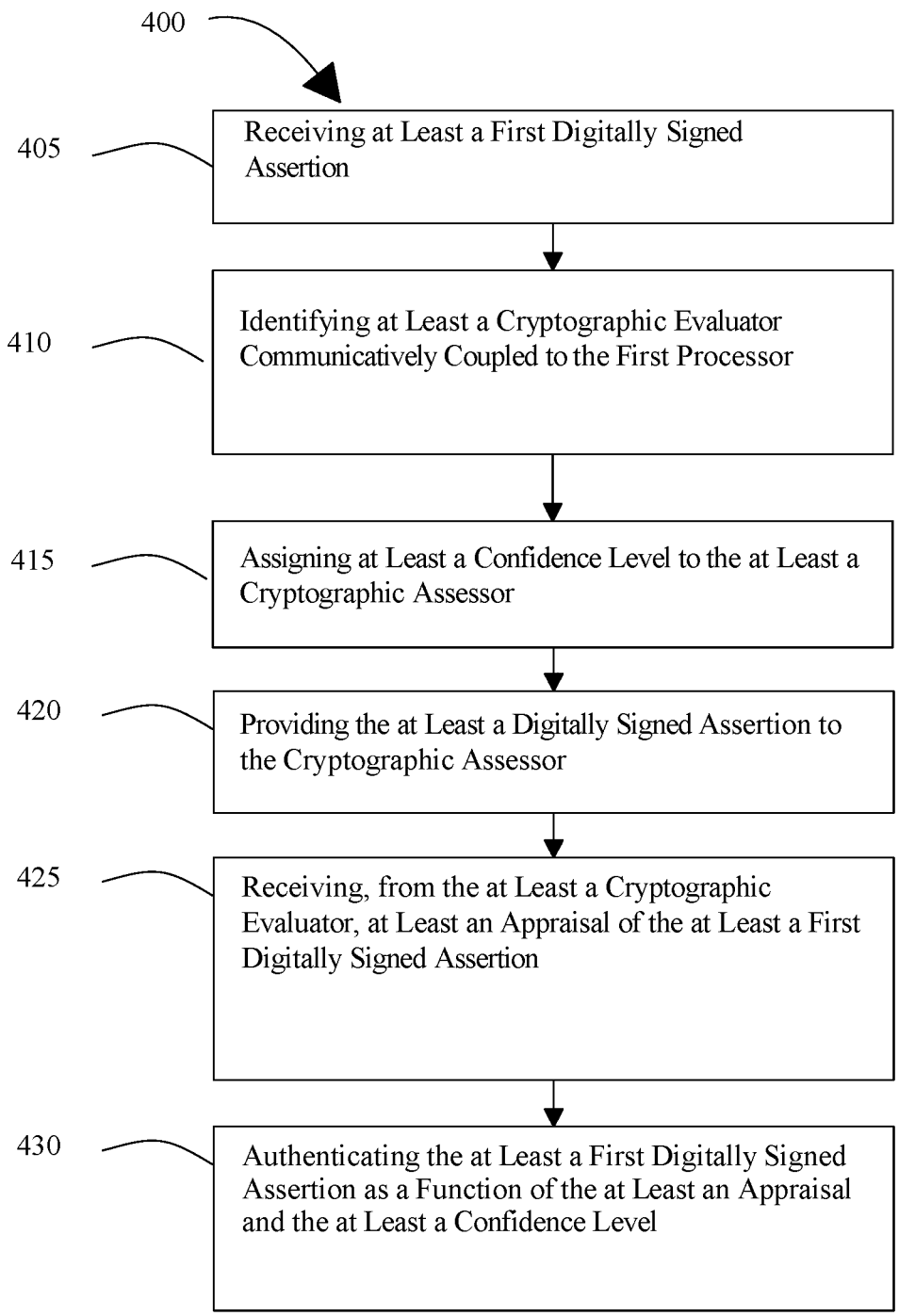
FIG. 4 is a flow diagram illustrating an exemplary method of authenticating a digitally signed assertion using verified evaluators.

Referring now to FIG. 4, an exemplary embodiment of a method 400 of authenticating a digitally signed assertion using a verified evaluator is illustrated. At step 405, authenticating device 104 receives a first digitally signed assertion 116. In an embodiment, first digitally signed assertion 116 may be any digitally signed assertion as described above, including without limitation a transaction recording an exchange of cryptocurrency, an assertion establishing a confidence level in one or more cryptographic evaluators as described in further detail below, an assertion recording an authentication determination as enacted in embodiments of method 400, or any other digitally signed assertion. Receiving first digitally signed assertion 116 may include, without limitation, receiving first digitally signed assertion 116 directly, receiving a temporally sequential listing 120, which may be a distributed ledger, distributed immutable ledger, and/or blockchain as described above including first digitally signed assertion 116. Temporally sequential listing 120 may include a temporally ordered plurality of sub-listings 200, wherein each sub-listing of the temporally ordered plurality of sub-listing contains at least a digitally signed assertion. Temporally sequential listing 120 may be immutable. One or more sub-listings 200 may be immutable. Receiving may include receiving a sub-listing 200 of a temporally sequential listing 120. Receiving may further include receiving a reference to first digitally signed assertion 116, temporally sequential listing 120, or sub-listing 200; reference may include without limitation a uniform resource locator (URL) indicating a location at which first digitally signed assertion 116, temporally sequential listing 120, and/or subfile is located, receiving a numerical or textual string identifying first digitally signed assertion 116, temporally sequential listing 120, and/or sub-listing 200, including without limitation a hash or checksum of first digitally signed assertion 116, temporally sequential listing 120, and/or sub-listing 200, or the like. Received first digitally signed assertion 116, temporally sequential listing 120, sub-listing 200, or reference thereto may be stored in memory 108 coupled to authenticating device 104.

At step 410, and with continued reference to FIG. 4, authenticating device 104 may identify at least a cryptographic evaluator 112. At least a cryptographic evaluator may include one or more cryptographic evaluators 112 as described above in reference to FIGS. 1-3. At least a cryptographic evaluator 112 may be communicatively coupled to authenticating device 104, for instance via network 300; at least a cryptographic evaluator may alternatively or additionally be incorporated in a single computing device or set of parallel devices with authenticating device 104. In an embodiment, authenticating device 104 selects cryptographic evaluator 112 from among a plurality of cryptographic evaluators communicatively coupled to authenticating device 104.

Still referring to FIG. 4, selection of least a cryptographic evaluator 112 may involve selection of one or more cryptographic evaluators 112 situated to perform steps as described herein in optimal processing times; this may be determined according to one or more measures of distance or time between each at least a cryptographic evaluator 112 and authenticating device 104. For instance, and without limitation, where plurality of cryptographic evaluators is connected to authenticating device 104 via a network, authenticating device 104 may identify a proximate cryptographic evaluator of the plurality of cryptographic evaluators in a graph representing the network; a proximal at least a cryptographic evaluator 112 on a graph, may include, for instance, a at least a cryptographic evaluator 112 within a certain number of steps through the graph from the authenticating device 104. Steps may also be weighted according to, e.g., estimates of physical distance or length of wire between cryptographic evaluators 112 connected by steps, as measured using network latency analysis and/or other processes for instance as described below. As a further example, selection may include selecting at least a geographically proximate at least a cryptographic evaluator 112 of the plurality of cryptographic evaluators 112. Geographical location of authenticating device 104 and/or at least a at least a cryptographic evaluator 112 may be performed by analysis of IP addresses, which may be compared to stored information mapping such addresses to particular geographical locations or the like; geographical location of authenticating device 104 may alternatively or additionally be determined using navigational facilities, such as the global positioning system (GPS) or other protocols used to determine the location of a device. Distance between authenticating device 104 and at least a at least a cryptographic evaluator 112 may be computed using this information and compared to a threshold value; at least a at least a cryptographic evaluator 112 may be selected only if distance is below the threshold value, which may include, for instance, a radius of a certain number of miles or kilometers around the determined location of the authenticating device 104.

Still viewing FIG. 4, selection may, as an additional example, include selection of a temporally proximate at least a cryptographic evaluator 112, which may be at least a cryptographic evaluator 112 that under network latency analysis, time for response to a "ping" signal, or the like presents a likelihood of a more rapid response. Alternatively or additionally, past response times and/or past times in which generation of appraisals as described in further detail below was performed may be recorded in memory 108 and/or in temporally sequential listing 120; selection of at least a cryptographic evaluator 112 may be performed based on past performance time.

Still viewing FIG. 4, selection may include selection of only highly trusted cryptographic evaluators 112, for instance as determined by determination of confidence levels as described below, such that the fewest cryptographic evaluators 112 are required for a given security requirement. These methods may be used to optimize network performance of authentication processes. In another example, additional data as described above that are incorporated into blocks or otherwise made available to nodes of the network may be utilized to optimally select which cryptographic evaluators 112 are selected. Selection of at least a cryptographic evaluator 112 may include selection to minimize total communication latency, where total communication latency is total expected time for each cryptographic evaluator 112 to respond with an appraisal as described in further detail below; such selection may involve determining, for instance, a selection of plurality of cryptographic evaluators 112 presenting an optimal or near-optimal network traversal time, which may be computed using node-count distances, geographical distances, network communication latency times, and/or expected performance times by particular cryptographic evaluators 112. Such optimization may involve a near-optimal resolution of a "traveling salesman" problem, including without limitation a "greedy algorithm" in which each selection step involves choosing a locally optimal cryptographic evaluator 112; for instance, authenticating device 104 may choose a first "nearest" cryptographic evaluator 112 as measured by any of the above metrics, including any measure of actual or path distance and/or any measure of communication or computation latency. Continuing the example, authenticating device 104 may subsequently select a second cryptographic evaluator according to a locally optimal next selection under the above-described metric or metrics, selecting from locally optimal steps that either first cryptographic evaluator 112, authenticating device 104, either, or both may perform. This may be repeated until a desired number of cryptographic evaluators 112 is selected; "desired" number may be a raw threshold number, an aggregate confidence level as described in further detail below, or the solution to another optimization problem such as optimization of confidence versus speed as described in further detail below. Alternatively or additionally, optimal selection may make use of data concerning previously performed transactions; use of such data may include selection of an acceptably rapid previous transaction, or use of a plurality of previous selections to produce an algorithmic or mathematical solution to optimal selection using, e.g. a polynomial regression process, a neural-net machine learning process, or the like. Persons skilled in the art will be aware of various machine learning, deep learning, or other adaptive techniques that may be used to approach such an optimization problem, upon reviewing the entirety of this disclosure.

In an embodiment, and still viewing FIG. 4, selection of at least a cryptographic evaluator 112 may include establishing an aggregate confidence-level threshold, determining confidence levels of the plurality of cryptographic evaluators 112, and identifying at least a cryptographic evaluator of the one or more cryptographic evaluators, the at least a cryptographic evaluator having an aggregate confidence level exceeding the aggregate confidence-level threshold. Evaluation of confidence level of each of the plurality of cryptographic evaluators 112 may be performed as described in further detail below. Establishment of an aggregate confidence level in a plurality of cryptographic evaluators 112 having a plurality of associated confidence levels may involve, e.g., adding together confidence levels; alternatively, aggregate confidence level may be computed by viewing each confidence level as a probability, calculating an aggregate probability by averaging or other statistical combination processes, and selecting cryptographic evaluators 112 so as to result in an aggregate probability representing a desired confidence level. Alternatively or additionally, a machine-learning algorithm as described above may analyze past transactions to determine an optimal mathematical operation for calculating an aggregate confidence level. As noted below, a desired confidence level to be used as a threshold may be computed in turn by reference to a user input indicating a desired confidence level, a minimal confidence level set by authenticating device 104 and/or network, for instance to ensure some degree of overall network integrity, a calculation based on a value of a transaction recorded in at least a digitally signed assertion 116, or the like.

Still viewing FIG. 4, in an embodiment, identifying the at least a cryptographic evaluator further includes generating a cost function of confidence level and communication latency and minimizing the cost function. In an embodiment, cost function may be selected to optimize one or more user and/or network goals. Goals to be optimized may include, without limitation, a desired degree of latency (defined herein as a speed with which authentication occurs), security (which may be defined, e.g., as a degree of confidence in the accuracy of the authentication process), anonymity (defined as a degree of difficulty in obtaining information concerning a user of querying device and/or a person entering a transaction on temporally sequential listing 120), and throughput (defined as an aggregate or average latency across users and cryptographic evaluators 112). There may be tradeoffs between the above-mentioned four goals. For instance, if user wishes to perform authentication rapidly, reducing the number of nodes in at least a highly trusted at least a cryptographic evaluator 112 may improve the speed with which authentication can take place, as may selection of proximate nodes as described above. Anonymity, however, may favor selection of more widely scattered cryptographic evaluators 112 to make it more difficult to deduce where authenticating device 104 is located geographically or within network; additional measures to ensure anonymity, such as use of an anonymizing protocol such as the Tor protocol promulgated by The Tor Project, Inc., which functions by directing all internet traffic through a network containing a plurality of relays to conceal a user's location and usage from network surveillance and/or traffic analysis attempts, using "onion routing" processes, or the like may further increase latency and slow down authentication. Similarly, where greater security is a goal, more nodes may be added to at least a highly trusted at least a cryptographic evaluator 112 to increase the statistical likelihood of correct authentication determinations, and selections of at least a highly trusted at least a cryptographic evaluator 112 across a wider range of network locations and/or geographical locations may improve the likely independence of authenticating nodes, also slowing the process. Thus, a person who wants to convey a large amount of money very secretly using a transaction recorded on temporally sequential listing 120 may desire a very high degree of security and anonymity, and may accept a greater degree of latency in exchange. As a non-limiting example, securities transfer or exchange processes may be implemented to be slower, and require greater security; regulatory obstacles to anonymity may mitigate against anonymity, anonymity may be sacrificed in favor of speed and accuracy, for instance, by authenticating using a small number of cryptographic evaluators 112 associated with high confidence levels. As another non-limiting example, wire-transfer and/or credit card transactions may require fast, high-security, processing, relying on high degree of trust and low anonymity on part of institutions (i.e. identifying the institutions and using strong protocols to identify devices associated therewith, while maintaining high anonymity on part of clients. As a further example, processes involving medical devices and/or medical data may require high anonymity and high security, which may be emphasized above speed. In an embodiment, the ability of method 400 or variations thereof to modify these parameters for optimal results in different scenarios may be highly advantageous over existing methods.

With continued reference to FIG. 4, cost function may be dynamically set by a selected degree of optimization for one or more attributes. Determining degree of optimization may be performed via a user interface, which may be a graphical user interface (GUI), for instance by providing a user with one or sliders representing desired degrees of security, transaction speeds, and/or levels of anonymity; sliders may be linked to absolute ranges of the attributes or may alternatively be used proportionally to represent relative importance to user of each attribute. Positions of one or more sliders may be reset according to stored mathematical relationships between different items; mathematical relationships may be determined by combining or producing machine-learning processes. A related or separate set of mathematical relationships may be used to determine how selection of at least a highly trusted at least a cryptographic evaluator 112 affects each attribute. Protocol implemented in embodiments herein may support varying security and anonymity demands by the parties to the transactions. For instance, two parties wishing to exchange $5M over the network will demand commensurate security and require some reduction in anonymity to comply with federal laws, in exchange for slightly longer validation times. Conversely, a customer purchasing a coffee at Starbucks will demand relatively little security and may be fully anonymous; a potential malicious actor utilizing a great number of small transactions to hide a large total transaction from regulators may be thwarted by identifying anonymous certificates that are re-used above some threshold and flagged by the network. This may allow network to self-adapt to meet varying demands.

With continued reference to FIG. 4, mathematical relationships between attributes and each other and/or between attributes and selection of at least a highly trusted at least a cryptographic evaluator 112 may be derived by collection of statistics concerning past transactions. In some embodiments, statistical relationships are determined through one or more machine learning processes; for instance, data describing the speed, authenticity, and anonymity of a plurality of past transactions may be subjected to regression analysis, such as linear or polynomial regression, to determine one or more equations relating one parameter of such transactions to one or more other such parameters. Similarly, a neural net may be provided with such a plurality of past transactions. Machine-learning processes may be supervised and/or unsupervised; for instance, attributes to compare may be preselected to ensure that machine-learning processes result in relationships between desired attributes and transaction parameters. Mathematical relationships may demonstrate, e.g., that a certain number of nodes in at least a highly trusted node results in a 95% degree of confidence in authenticity, that a second, higher number of nodes results in a 98% degree of confidence, and the like. As a further example, mathematical relationships may associate a level of anonymity, as measured in average proportion information content concerning user and/or authenticating device 104 obtainable from a transaction, information entropy of transaction, or the like, to average network or geographical distance between nodes of at least a highly trusted node, to selection of protocols to anonymize, and the like. Relationships between, the above parameters and latency may also be represented. Direct relationships between attributes to be optimized may be determined by machine learning processes; alternatively or additionally, such relationships may be determined using relationships of each attribute to parameters of selected at least a highly trusted node.

Still referring to FIG. 4, authenticating device 104 may use one or more additional selection criteria to choose at least a cryptographic evaluator 112. As a non-limiting example, authenticating device 104 may identify at least cryptographic evaluator 112 by determining a degree of involvement of a cryptographic evaluator, of the plurality of cryptographic evaluators, in at least a digitally signed assertion, and selecting the at least a cryptographic evaluator 112 as a function of the determination. Determining a degree of involvement may involve determining whether a cryptographic evaluator has digitally signed the digitally signed assertion; where cryptographic evaluator digitally signed the assertion, cryptographic evaluator may have an interest in the outcome of the assertion. Where cryptographic evaluator is identified in the at least a digitally signed assertion, cryptographic evaluator may have an interest in the outcome of the assertion. Where cryptographic evaluator is identified in or has signed a distinct digitally signed assertion listed in, for instance, a recent sub-listing 200 and/or set of sub-listings 200 yet to be authenticated, cryptographic evaluator may have an interest in authentication performed in method 400. In an embodiment, authenticating device 104 may not select cryptographic evaluator where cryptographic evaluator has an interest in the authentication, assertion, and/or currently un-authenticated sub-listing 200 or temporally sequential listing 120 instance; authenticating device 104 may reduce a determined confidence level of such an evaluator, and may select the evaluator at the reduced confidence level.

With continued reference to FIG. 4, identification of at least a cryptographic evaluator 112 may further involve determination that a cryptographic evaluator of plurality of cryptographic evaluators is currently available; determination may involve "pinging" cryptographic evaluator, viewing cryptographic evaluator in a listing of evaluators currently "online" on network 300, or the like.

At step 415, and still referring to FIG. 4, authenticating device 104 assigns at least a confidence level to at least a cryptographic evaluator. This may be performed by methods including reference to varying trust levels associated with various different implementations of secure computing modules 124 as described above. In an embodiment, assigning at least a confidence level includes determining an identity of at least a cryptographic evaluator, and assigning the confidence level as a function of the identity of the at least a cryptographic evaluator. Determination of identity of the at least a cryptographic evaluator may be performed using a trusted third-party (TTP) scheme. In an embodiment, a TTP scheme is a scheme in which a designated entity, such as a certificate authority as described above monitors and reviews a digital signature passed between two or more communicants, such as authenticating device 104 and at least a cryptographic evaluator 112. For instance, authenticating device 104 or another device in communication with at least a cryptographic evaluator 112 may convey to at least a cryptographic evaluator a "challenge" containing some element of data to which at least a cryptographic evaluator 112 may respond with a digital signature signing the challenge with a private key. A certificate authority may then attest to the possession of the private key by at least a cryptographic evaluator 112, thus identifying the at least a cryptographic evaluator 112 to the authenticating device 104. Certificate authority may include, without limitation, a manufacturer of a secure computing module 124 as described above; in an embodiment, verification of identity of at least a cryptographic evaluator by certificate authority may be combined with additional identification of cryptographic evaluator using secure computing module 124 as described in further detail below. With continued reference to FIG. 4, a TTP process may be used to establish confidence level in at least a cryptographic evaluator 112 directly; for instance, a certificate authority may vouch for one or more attributes of at least a cryptographic evaluator 112, and such voucher may be used, solely or in combination with other processes, to determine the confidence level.

With continued reference to FIG. 4, identifying at least a cryptographic evaluator 112 may alternatively or additionally involve identifying the at least a cryptographic evaluator 112 using a secure computing module 124 incorporated in the at least a cryptographic evaluator 112. For instance, secure computing module 124 may sign a challenge or other element of data using a digital signature that may only be signed by secure computing module 124; this may be accomplished by reference to a manufacturer's identification of a public key associated with the secure computing module 124 private key used in the signature. Secure computing module 124 may sign with a private key generated using a PUF as described above. In an embodiment, and as a non-limiting example, secure computing module 124 may implement a decentralized anonymous authentication scheme (DAA). In an embodiment, DAA is an anonymous digital signature scheme, which instead of reliance on a certificate authority to link a particular private key to a particular party, uses reference to a group public key or to multiple public keys to verify an anonymous signature. This may be performed, for instance using a "principal signer" implementing a TPM 128 protocol. TPM 128 protocol may be performed using a TPM 128 operated on at least a cryptographic evaluator 112 and/or as part of a secure computing module 124 operating on at least a cryptographic evaluator 112. TPM 128 may be used as a "first signer" of a digital certificate, signing with a physically embedded private key as described above. In an embodiment TPM 128 signs an element of data using physically embedded private key, indicating that the possessor of the TPM 128 is signatory. A second signer, which may be TPM 128 and/or at least a cryptographic evaluator 112, may previously or subsequently sign the element of data or another element linked to the element signed using physically embedded private key. First signer may, for instance, sign an element of data to form a transaction as described above regarding immutable ledger to an address representing a public key that is linked to a private key used by second signer. Various versions of this protocol may be implemented, and persons skilled in the art, upon reviewing the entirety of this disclosure, will be aware of the many variations that may be applied to perform a TPM 128 protocol.

Continuing to refer to FIG. 4, assigning the at least a confidence level may include performing a trusted time evaluation of at least an action performed by the at least a cryptographic evaluator 112. At least an action may be a response from at least a cryptographic evaluator 112 to authenticating device 104 and/or any other device connected to at least a cryptographic evaluator 112, for instance using network 300 as described above. At least an action may be creation or signature of at least a signed assertion. Trusted time verification of timestamps provided in at least an action may be performed as described above regarding trusted time implementations. Alternatively or additionally, a response time or response latency of a particular cryptographic evaluator of at least a cryptographic evaluator may be tracked and compared to at least an action; for instance, where at least an action has a latency or response time that differs more than a threshold amount from the typical response time, confidence level regarding that cryptographic evaluator may be lowered, to reflect a greater probability, as a non-limiting example, of a "man in the middle" attack.

In an embodiment, and still referring to FIG. 4, assignment of at least a confidence level may include calculation of at least a heuristic of trust. As a non-limiting example, authenticating device 104 and/or another computing device calculates at least a heuristic of trust as a function of the at least an authorization request from the remote device. At least a heuristic of trust may include one or more processes for determining a degree to which a device such as cryptographic evaluator 112 and/or requesting device 140 may be treated as trustworthy, based on partial or limited information; for instance, at least a heuristic of trust may be calculated or computed with regard to cryptographic evaluator 112 and/or requesting device 140 not identifiable using a secure computing module 124, by using geographic location, device fingerprint information, and/or other data as described in further detail herein, to identify determine trust in a device that is not as definitely identifiable as it would be using a secure computing module 124. At least heuristic of trust may output a confidence level as defined above as its output, and/or take at a confidence level as an input. Heuristics to infer trustworthiness of cryptographic evaluator 112 and/or requesting device 140 may be used in a positive or negative sense—that is, a positive heuristic connotes more trustworthiness, while a negative heuristic can be used to flag outliers that may be considered more likely to behave dishonestly.

Still referring to FIG. 4, calculation of at least a heuristic of trust may include determining a duration of past interaction and calculating the at least a heuristic as a function of the duration of past interaction; for instance, if cryptographic evaluator 112 and/or requesting device 140 has a longer history of interactions with authenticating device 104 and/or a network or platform at issue, authenticating device 104 may assign a higher confidence level to cryptographic evaluator 112 and/or requesting device 140. Calculating the at least a heuristic of trust may include determining a most recent time of past interaction and calculating the at least a heuristic of trust as a function of the most recent time of past interaction; for instance, where cryptographic evaluator 112 and/or requesting device 140 has interacted with authenticating device 104 and/or a network or platform in question more recently a higher confidence level may be associated with remote device 108 as described in more detail directly below. Calculating at least a heuristic of trust may include determining a degree of obscurity of the cryptographic evaluator 112 and/or requesting device 140; for instance, where cryptographic evaluator 112 and/or requesting device 140 is sandboxed (preventing evaluation of machine-control parameters), or connecting through a proxy, TOR or other location/IP address-obscuring protocol or facility, the resulting inability to discover information concerning cryptographic evaluator 112 and/or requesting device 140 may itself be used to assign a lower confidence level to at least a cryptographic evaluator 112 and/or requesting device 140.

Still referring to FIG. 4, authenticating device 104 may determine an identity of cryptographic evaluator 112 and/or requesting device 140 by identifying a device fingerprint of remote device; this may be performed as a function of at least a field parameter of at least a communication, which may include all or part of a communication submitted via remote device. At least a field parameter may be any specific value set by remote device, device containing remote device and/or user thereof for any field regulating exchange of data according to protocols for electronic communication. As a non-limiting example, at least a field may include a "settings" parameter such as SETTINGS_READER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session age" representing a number of seconds from time of creation of session to time of a current transaction or communication, "session_id," "transaction_id," and the like. Determining the identity of the remote device may include fingerprinting the remote device as a function of at least a machine operation parameter described in the at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of remote device, a browser running on remote device, or the like, or any other parameters of machine control or action available in at least a communication. In an embodiment, a plurality of such values may be assembled to identify processor and distinguish it from other devices. For instance, user profile may contain information that may be compared to transaction history and/or device fingerprint; where such information is inconsistent in a manner suggesting some prevarication or degree of obfuscation, this may result in a lower confidence level than if such data is consistent.

Still viewing FIG. 4, further methods may involve establishing a confidence level in a network of devices, which may be or include a network of cryptographic evaluators. Such networks may include, for instance, networks of networks. Networks may include a network having two or more trusted computing devices. In some embodiments the network may consist only of trusted computing devices. In some embodiments, the network may include untrusted computing devices; communication to untrusted computing nodes may be mediated by one or more trusted nodes. Communication between any trusted and untrusted nodes accomplished by method of establishing a secure communication channel. In some embodiments, a trusted device may provide a cryptograph hash of trusted computation to one or more devices in the network as an assertion of trusted status. Confidence level in network may be established via anonymous attestation the trusted status of a network, wherein trust is defined by the least common denominator.

With continued reference to FIG. 4, and as a further example, identifying at least a cryptographic evaluator 112 may involve implementing an attestation protocol as described above. In an embodiment, secure computing module 124 may perform attestation protocol to identify itself; in another embodiment, secure computing module 124 may perform an attestation protocol with regard to a program. For instance, secure computing module 124 may use a program verification attestation protocol to demonstrate that secure computing module 124 is the same secure computing module 124 used to perform a previous transaction; previous transaction may include, without limitation, a previous digital signing of a digitally signed assertion 116, a previous generation of an appraisal of a digitally signed assertion 116 as described in further detail below, or any other program execution that may be associated with secure computing module 124 and/or cryptographic evaluator. Persons skilled in the art, upon reviewing the entirety of this disclosure, will be aware of various processes whereby a secure computing module 124 may be used to identify a cryptographic evaluator 112 in which the secure computing module 124 is incorporated.

Still referring to FIG. 4, authenticating device 104 may determine a confidence level in identity of at least a cryptographic evaluator 112. Confidence level in identity may be computed, for instance, using one or more statistical measures of reliability of the identification method used; for instance, a user may enter an instruction on authenticating device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. Authenticating device 104 may also determine confidence level in identity as a function of, for instance, one or more algorithms collecting statistics concerning degree of accuracy in past iterations of method 400 of a particular process for identifying at least a cryptographic evaluator 112.

With continued reference to FIG. 4, identifying at least a cryptographic evaluator 112 may include identifying a first cryptographic evaluator using a first identification protocol and identifying a second cryptographic evaluator using a second identification protocol. As a non-limiting example, a first cryptographic evaluator of a plurality of cryptographic evaluators may be identified using a TTP protocol, while a second may be identified using a DAA protocol. As a further example, a first cryptographic evaluator may be identified using a first version of a secure computation module 124 incorporated in the first cryptographic evaluator, while a second cryptographic evaluator may be identified using a second version of a secure computation module 124; the first version may, for instance, be a GhostRider implementation while the second is an SGX implementation, or the like. In an embodiment, identification of cryptographic evaluators using heterogenous methods decreases the likelihood of an exploit successfully compromising all evaluators, as such an exploit would be required to take advantage of a potentially wide range of different vulnerabilities. Furthermore, in an embodiment authenticating device 104 may perform a time-of-evaluation selection of identification protocols, for instance by selecting from a stored menu of protocols using a random number generator or pseudorandom number generator; this may further decrease the probability of a successful exploit.

Continuing to refer to FIG. 4, assigning a confidence level may further include evaluating at least a second digitally signed assertion signed by a cryptographic evaluator of at least a cryptographic evaluator 112 and assigning a confidence level to the cryptographic evaluator as a function of the evaluation of the at least a second digitally signed assertion. At least a second digitally signed assertion may be identified as signed by the cryptographic evaluator using any identification process or protocol as described above. In an embodiment, at least a second digitally signed assertion is incorporated in a temporally sequential listing of digitally signed assertions; as a non-limiting example, first digitally signed assertion may be contained in a temporally sequential listing of digitally signed assertions and second digitally signed assertion may be contained in the temporally sequential listing of digitally signed assertions. For instance, where temporally sequential listing 120 is a blockchain or similar data structure, each assertion may be included in the blockchain. At least a second digitally signed assertion may include a plurality of digitally signed assertions. For instance, at least a at least a cryptographic evaluator 112 may record a series of digitally signed assertions in temporally sequential listing 120; each transaction of the series of transactions may be authenticated by any process suitable for authenticating temporally sequential listing 120, including any process described herein for authentication of temporally sequential listing 120. Transactions performed by at least a at least a cryptographic evaluator 112 may be scored according to authenticity; for instance, trusted status may be conferred on at least a cryptographic evaluator 112 only if a certain number of authenticated transactions have been performed by at least a cryptographic evaluator 112, a certain amount of value has been conveyed in authenticated transactions by at least a node, a certain proportion (which may be 100%) of transactions performed by at least a at least a cryptographic evaluator 112 have been successfully authenticated, or any other suitable benchmarking and/or scoring process or combination thereof. At least a second assertion may include assertions that were recorded in rejected instances of temporally sequential listing 120, such as rejected forks; in an embodiment, confidence level may be reduced as a function of a number of rejected forks including assertions signed by at least a cryptographic evaluator, for instance.

Still referring to FIG. 4, in an embodiment, determining a confidence level may include determining that at least a cryptographic evaluator is disinterested from the at least a first digitally signed assertion; this determination may be performed as described above. Confidence level may be adjusted where at least a cryptographic evaluator is determined to be interested as described above; for instance, user-entered or other instructions in memory may specify a multiplier or other mathematical calculation modifying a confidence level otherwise found for a cryptographic evaluator; as a non-limiting example a confidence level may be reduced by 5% for a cryptographic evaluator involved in an assertion included in a sub-listing 200 also containing at least a first digitally signed assertion, and 10% for direct involvement of a cryptographic evaluator in the first digitally signed assertion. Degree to which involvement of cryptographic evaluator in first digitally signed assertion affects confidence level may also be assessed using data describing past iterations of method 400 and/or past authentication methods wherein one or more interested cryptographic evaluators were involved in authentication; machine learning algorithms as described above may, for instance, be used.

With continued reference to FIG. 4, confidence level may be determined by a consensus process; for instance, all cryptographic evaluators currently connected to network 300 may determine a confidence level concerning a particular cryptographic evaluator. This determination may be performed, for instance, by authenticating one or more past instances of temporally sequential listing 120 and/or one or more sub-listings 200 thereof. Determination may include identification of one or more rejected instances of temporally sequential listing 120. Each cryptographic evaluator of plurality of cryptographic evaluators may provide a confidence level for the cryptographic evaluator to be evaluated. Authenticating device 104 and/or another processor communicatively coupled to network 300 may calculate an aggregate confidence level based on confidence levels submitted by plurality of cryptographic evaluators; aggregation may be performed according to any method for aggregation of confidence levels described above. In an embodiment, aggregation may be weighted according to a previously determined confidence level of each cryptographic evaluator of plurality of cryptographic evaluators performing consensus determination of confidence level of cryptographic evaluator to be evaluated. This may include, e.g., ignoring confidence level submissions from evaluators having confidence levels below a certain threshold; alternatively or additionally, authenticating device 104 may request confidence level determinations by a plurality of evaluators previously determined to have a confidence level above a certain threshold level.

With further reference to FIG. 4, assigning the at least a confidence level may include evaluating an assertion, in a temporally sequential listing 120 of assertions, assigning a recorded confidence level to a cryptographic evaluator of the at least a cryptographic evaluator, and assigning the confidence level as a function of the recorded confidence level. For instance, one or more processors, a consensus process, authenticating device 104, and/or a network of cryptographic evaluators having a confidence level in excess of a threshold, may have previously evaluated a confidence level in a certain cryptographic evaluator; in an embodiment, such a confidence level may itself be recorded in an assertion listed in temporally sequential listing 120. A plurality of such assertions, corresponding to a plurality of cryptographic evaluators, may be listed; as such, authenticating device 104 may determine confidence level in one or more cryptographic evaluators solely by retrieving confidence levels so recorded. Alternatively or additionally, authenticating device 104 may combine such confidence levels with confidence level determinations made by other means. Combination may be performed, e.g., by retrieving such confidence levels from temporally sequential listing 120 for at least a first cryptographic evaluator and calculating a confidence level for at least a second cryptographic evaluator by any other process described above. As a further example, authenticating device 104 may retrieve a confidence level recorded in temporally sequential listing 120 for a given cryptographic evaluator, determine a confidence level for the same cryptographic evaluator, and then aggregate the two confidence levels according to any process as described above for aggregation of confidence levels.

Still referring to FIG. 4, authenticating device 104 may further weight or modify confidence level according to one or more additional factors. For instance, confidence level may be weighted according to how recently cryptographic evaluator signed a digitally signed assertion in an authenticated instance of temporally sequential listing 120, where a more recently authenticated assertion may result in a higher confidence level or higher weight assigned to the confidence level, and a less recently authenticated assertion may result in a lower confidence level, or a lower weight assigned to that confidence level. As another example a cryptographic evaluator that has recently "sold off" a large amount of value and/or has an assertion in a sub-listing 200 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

At step 420, and still referring to FIG. 4, authenticating device 104 provides the at least a digitally signed assertion to at least a cryptographic evaluator 112. Provision of the at least a first digitally signed assertion may be performed in any manner suitable for reception of the at least a first digitally signed assertion. For instance, and without limitation, at least a first digitally signed assertion may be directly transmitted to at least a cryptographic evaluator 112. A temporally sequential listing 120 instance containing at least a first digitally signed assertion may be transmitted to at least a cryptographic evaluator 112. A sub-listing 200 containing at least a first digitally signed assertion may be transmitted to at least a cryptographic evaluator 112. Alternatively or additionally, an indication of at least a first digitally signed assertion, such as a URL, hash, checksum, or the like may be transmitted.

At step 425, and still referring to FIG. 4, authenticating device 104 may receive, from at least a cryptographic evaluator 112, at least an appraisal of the at least a first digitally signed assertion. At least a cryptographic evaluator 112 may generate the at least an appraisal by evaluating a digital signature of at least a first digitally signed assertion 116; digital signature may be compared to a public key known to be associated with a device or entity alleged to have signed the at least a first digitally signed assertion 116. Where at least a first digitally signed assertion includes an address as described above, at least a cryptographic evaluator 112 may evaluation earlier digitally signed assertions referencing the address, for instance tracing back a given transfer of value or other item through a series of such transactions, as described above. Where at least a first digitally signed assertion is included in a temporally sequential listing 120 instance, at least a cryptographic evaluator may authenticate the instance; this may be performed according to any method for authenticating an instance of a temporally sequential listing 120 or sub-listing 200, including hashing one or more sub-listings and comparing hashes to listed values, following sequence of hashed sub-listings 200 to a "genesis block" or a block/sub-listing acknowledged by a consensus process or the like to be an authentic entry, or any other process that may occur to a person skilled in the art upon reviewing the entirety of this disclosure. Receiving the at least an appraisal may include receiving at least an appraisal of a temporally sequential listing 120 of assertions containing the at least a first digitally signed assertion. Receiving the at least an appraisal may include receiving at least an appraisal of a digital signature of the at least a first digitally signed assertion. Receiving the at least an appraisal may include receiving at least an appraisal of information contained in the at least a first digitally signed assertion.

Still viewing FIG. 4, appraisal may include a binary determination that at least a first digitally signed assertion and/or temporally sequential listing 120 containing at least a first digitally signed assertion is or is not authentic. As another non-limiting example appraisal may include a confidence level of at least a cryptographic evaluator 112 regarding at least a first digitally signed assertion and/or temporally sequential listing 120. At least an appraisal may be digitally signed; for instance, at least an appraisal may be digitally signed using a key that may be associated with at least a cryptographic evaluator 112 according to any methods or means described above for associating a key with a cryptographic evaluator 112.

At step 430, and still referring to FIG. 4, authenticating device 104 authenticates at least a first digitally signed assertion as a function of at least an appraisal and at least a confidence level. For instance, where receiving at least an appraisal includes receiving an appraisal confidence level, authenticating at least a first digitally signed assertion 116 may include authenticating the at least a first digitally signed assertion as a function of the appraisal confidence level; as a non-limiting example appraisal confidence level may be aggregated with confidence level assigned to at least a cryptographic evaluator according to any process for such aggregation as described above. As a further example, where at least a cryptographic evaluator includes a plurality of cryptographic evaluators, and the plurality of cryptographic evaluators has a number of cryptographic evaluators, authenticating the at least a first digitally signed assertion may include authenticating the at least a first digitally signed assertion as a function of the number of cryptographic evaluators. For instance, an overall confidence level in at least a first digitally signed assertion 116 may be determined to be higher where a greater quantity of cryptographic evaluators is higher, and lower where the overall number of cryptographic evaluators is lower; the number may be the number of cryptographic evaluators that submit appraisals, which may be lower than the number to which authenticating device 104 provided at least a first digitally signed assertion, such that weighting by number of responses may aid in determining whether the authentication process is sufficiently robust for a given threshold determination, as discussed in further detail below.

Still referring to FIG. 4, where at least a cryptographic evaluator includes a plurality of cryptographic evaluators, authenticating the at least a first digitally signed assertion may include determining an aggregate confidence level of the plurality of cryptographic evaluators and authenticating the at least a first digitally signed assertion as a function of aggregate confidence level. Aggregation of confidence levels may be performed according to any process for aggregation as described above. In an embodiment, aggregate confidence level is further aggregated with appraisal confidence levels; for instance, each cryptographic evaluator's appraisal confidence level may be aggregated with that cryptographic evaluator's assigned confidence level, and then further aggregated with similarly obtained confidence levels from other cryptographic evaluators.

In an embodiment, and still viewing FIG. 4, plurality of cryptographic evaluators 112 may have differing levels of trusted status. Differing levels may be based upon properties of incorporated secure computing modules 124; non-limiting examples of such properties may include the length of private keys, randomness and entropy of private key generator, degree of complexity of secure computing module 124 generation, strength of security assumptions or contemplated adversaries in implementing secure computing module generation 124, brand or reputation of manufacturer, or other properties as described above. Alternatively or additionally, differing levels of trust may be based upon, e.g., a number of transactions in a transaction record of a at least a cryptographic evaluator 112 as described above, a proportion of successful transactions, an aggregate value of transactions and/or aggregate value of successful transactions as a proportion of aggregate value of transactions, any other metric, or any combination thereof, as described above. In an embodiment, where the at least a cryptographic evaluator 112 includes a first cryptographic evaluator having a first confidence level and producing a first appraisal of the at least an appraisal and a second cryptographic evaluator having a second confidence level and producing a second appraisal of the at least an appraisal, and where the confidence level is different from second confidence level, authenticating the at least a first digitally signed assertion may include weighting the first appraisal by first confidence level and second appraisal by the second confidence level; this may be a natural consequence of a method of aggregation of confidence levels and/or appraisals as described above. In an embodiment some cryptographic evaluators may have, for instance, a neutral confidence level, indicating that no information is available to determine a confidence level for those cryptographic evaluators; such evaluators may be assigned a confidence level and/or weight consistent with the lack of information. This may enable the implementation of a hybrid network containing "trusted" cryptographic evaluators and "consensus" cryptographic evaluators.

With continued reference to FIG. 4, authenticating device 104 may produce a true or false authentication result based on the above-described determinations. For instance, and without limitation, authenticating device 104 may compare an aggregate confidence level to a threshold confidence level; threshold confidence level may be set, as a non-limiting example, by a user selection of a slider as described above. Alternatively or additionally, threshold level may be set automatically by authenticating device 104 as a function of, for instance, an exchanged value represented in at least a first digitally signed assertion 116, where threshold level may be higher, for instance, for higher values. As a further example, threshold level may be lower where at least a first digitally signed assertion 116 was signed by a cryptographic evaluator 112 having a higher confidence level, and lower where at least a first digitally signed assertion 116 was signed by a cryptographic evaluator 112 having a lower confidence level.

Still referring to FIG. 4, where aggregate confidence level falls below an applicable threshold, authenticating device 104 may determine that authentication of at least a first digitally signed assertion 116 has failed. Authenticating device 104 may determine a cause for failure; for instance, if all responding cryptographic evaluators appraised at least a first digitally signed assertion 116 as authentic and/or provided it a high confidence level, but an insufficient number of evaluators responded with appraisals and/or an aggregate confidence level of responding cryptographic evaluators was too low, authenticating device 104 may initiate method or some steps of method again to iteratively arrive at a sufficient network of cryptographic evaluators to produce a reliable answer. Where responding cryptographic evaluators assessed at least a first digitally signed assertion as inauthentic or provided a low assertion confidence level, authenticating device 104 may determine that at least a first digitally signed assertion 116 is inauthentic.

With continued reference to FIG. 4, where authenticating device 104 determines that at least a first digitally signed assertion is authentic, authenticating device 104 may provide an indication that at least a first digitally signed assertion is authentic to a user, a cryptographic evaluator, all cryptographic evaluators attached to network 300, or any other suitable device. Where, for instance, temporally sequential listing 120 and/or a sub-listing 200 has been determined to be authentic according to method 400, authenticating device 104 may distribute listing to all cryptographic evaluators in network, or to all nodes configured to receive authenticated instances of temporally sequential listing 120.

In an embodiment, the above-described method 400 enables authentication by a smaller number of cryptographic evaluators 112 to produce an equally reliable result to that created by traditional consensus-based authentication in a much smaller amount of time. Additional performance improvements may be realized by use of trusted cryptographic evaluators 112 that are closer, and thus capable of more rapid responses. Current block chain-based technologies utilize consensus of large numbers of anonymous cryptographic evaluators 112 to secure a at least a digitally signed assertion 116 rather than relying upon trusted parties. While decentralization is beneficial and avoids the need for trusted entities, the time and cost to authenticate a at least a digitally signed assertion 116 using consensus is prohibitive relative to a trusted party. Several efforts claim to enable faster at least a digitally signed assertion 116, either by processing only sub-listings 200 and then authenticating on the chain (e.g. Ripple, Lightning) or by using a smaller number of "honest" cryptographic evaluators 112, considered "trusted" by various heuristics, to authenticate a at least a digitally signed assertion 116 in an "accelerator" mode onto an "optimistic fast path" (e.g. Thunder Consensus—see https://eprint.iacr.org/2017/913.pdf). These fundamentally break several promises of block chain, though: the at least a digitally signed assertion 116 is not actually considered secure and authentic until placed on the "slow" chain, so other measures (e.g. escrow, proxy for trusted party, or other) are utilized to "secure" this fast at least a digitally signed assertion 116 in the interim. When found to be corrupted, these "accelerator" at least a digitally signed assertion 116 are reverted. This may be a benefit over other e.g. clearinghouse style at least a digitally signed assertion 116 protocols but is not actually any better than the existing block chain solutions in terms of capital outlay. (e.g., for this period of, say, 10 minutes, both sides of the at least a digitally signed assertion 116 effectively still hold that balance of the at least a digitally signed assertion 116 on the books). As a result, selection of a subset of cryptographic evaluators 112 to perform authentication may produce far more efficient authentication. In the limit of a network consisting of only trusted nodes, block verification may occur several orders of magnitude faster than any current approach, with scalability increasing proportionally. Further, DAA with trusted hardware may allow for optimization of decentralized routing, which accelerates and builds upon the notion of shards in existing protocols.

Referring now to FIG. 5, an exemplary embodiment of a method 500 of authenticating a requesting device using verified evaluators is illustrated. At step 505, an authenticating device 104 receives at least first digitally signed assertion from a requesting device 140. Requesting device 140 may include any requesting device 140 as described above; in an embodiment, requesting device 140 is a device seeking authorization from authenticating device 104 to perform an action. Action may include obtaining access rights to an element of data, a data structure, a device, a platform, and/or a program. Action may include performance of a program or application and/or participation in a program or application; requesting device 140 may be requesting access to a given application "layer" or set of applications. A layer or set of applications may be a set of applications corresponding to a particular security level; for instance, security levels as described may correspond to degrees of security required for different purposes as described above in reference to FIGS. 1-4. Request may alternatively or additionally include a credential renewal request, which as used in this disclosure is a request, given a first credential associated with a first temporal attribute, to generate a second credential with a second temporal attribute; for instance, first credential may be approaching expiration of a period or epoch in which first credential is valid, and request may be for a second credential having a second period or epoch of validity that will continue when the first has expired or lapsed. First credential may include an expired credential.

Still referring to FIG. 5, at least first digitally signed assertion may be any digitally signed assertion as described above in reference to FIGS. 1-4. At least a digitally signed assertion may be received according to any process as described above for receiving at least a digitally signed assertion. At least a first digitally signed assertion is linked to at least a verification datum; at least a verification datum may include any verification datum as described above. In an embodiment, authentication device 104 may select itself and/or be selected by another device within system 100, such as without limitation a cryptographic evaluator 112, to perform one or more steps of method 500 by generation of a random oracle output assigning the at least a first digitally signed assertion and/or request associated therewith to a device in system 100. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties such as a secure computing module 124, two or more devices operating under the principle of proof of elapsed time as demonstrated by Hyperledger sawtooth from IBM, or other random leader election mechanism. In an embodiment, an authorization request applied to a random oracle output may be randomly assigned, by virtue of the random oracle output, to a device, such as without limitation authenticating device 104. In an embodiment, generating a random oracle output assigning the authorization request to a device, such as without limitation authenticating device 104 may include generating a cryptographic hash from the authorization request. In an embodiment, a cryptographic hash may include a series of values in the set [0, 1]. In an embodiment, the cryptographic hash generated from the authorization request may include a parameter of the authorization request. In an embodiment, the cryptographic hash generated by the at least a verifying node may include an identification string generated by a PUF from the at least a verifying device. The identification string may be digitally signed by a PUF and/or any secure proof generated by the at least a verifying node, where an element being "signed by PUF" and/or "generated by a PUF," as used herein, may include any PUF-backed and/or derived key generation or the like as described herein. In an embodiment, the cryptographic hash may be available to the public, meaning other devices and/or verifying nodes on the network, so that the hash may indicate that a random oracle was used to randomly assign first verifying node 104 to remote device 108.

At step 510, and with continued reference to FIG. 5, authenticating device 104 evaluates at least a second digitally signed assertion, signed by at least a cryptographic evaluator, conferring a credential to the requesting device. Evaluation of at least a second digitally signed assertion may be performed, without limitation, as described above in reference to FIGS. 1-4. In an embodiment, second digitally signed assertion may include a plurality of digitally signed assertions generated by a plurality of cryptographic evaluators; this may be implemented, without limitation, as described above in reference to FIGS. 1-4. In an embodiment, and as further described above in reference to FIGS. 1-4, at least a second digitally signed assertion may be in a temporally sequential listing 120. Alternatively or additionally, credential may be received from at least a cryptographic evaluator 112, which may be selected and/or identified according to any method described in reference to FIGS. 1-4, according to any process, means, and/or method for receiving data, assessments, and/or digitally signed assertions from at least a cryptographic evaluator 112 as described in reference to FIGS. 1-4.

Still referring to FIG. 5, credential may include at least an authorization datum. As used herein, an authorization datum is a datum granting one or more rights that may be requested in an authorization request as described above. For instance, and without limitation, an authorization datum may include a digital certificate as described above; digital certificate may, for instance and without limitation, associate an identity of a user or entity operating requesting device 140 with an identifier of remote device, confer upon remote device access rights to one or more resources incorporated in or connected to system 100, associate requesting device 140 with a given confidence level, grant a transfer of assets, data, and/or access rights from one device to another, or the like. An authorization datum may confer a right to access one or more resources incorporated in or connected to system 100, including without limitation access to digital rights management (DRM) restricted materials including without limitation time-limited, geographic location limited or otherwise restricted material as a single datum, a stream of data such as a media stream, or any combination of access-controlled resources. An authorization datum may associate an identity of a user or entity operating requesting device 140 with an identifier of remote device. An authorization datum may confer upon remote device access rights to one or more resources incorporated in or connected to system 100. An authorization datum may associate requesting device 140 with a given confidence level. An authorization datum may grant a transfer of assets, data, and/or access rights from one device to another, or the like. In an embodiment, an authorization datum may classify requesting device 140 as a cryptographic evaluator 112 authorized to perform actions described herein as performed by first verifying node 104, which may be performed in combination with other verifying nodes as described in further detail below. In an embodiment, the authorization datum may certify requesting device 140 to participate on the network as a non-verifier. In such an instance, requesting device 140 may participate on the network but requesting device 140 may not be a first verifying node 104. In an embodiment, the authorization datum may certify requesting device 140 to access system 100 and/or a network implemented by the system 100. In such an instance, requesting device 140 may access the network but may not verify and/or participate in certain services on the network. Credential and/or authorization datum may further include or be associated with a confidence level that first verifying device 104 has associated with requesting device 140 as described above. In an alternative embodiment where the specifics of time remaining on a credential and/or authorization token may be undesirable to expose, e.g. when such information may aid malicious actors in preferentially targeting a particular requesting device 140, authorization datum and/or credential, in the open or via shared cryptographic key specific to authenticate devices or a subset of authenticated devices, may simply indicate whether or not the credential is valid at time of inquiry. It may be desirable to limit the number of requests for validity of a credential, e.g. to avoid exposing information that may aid malicious actors in preferentially targeting a particular requesting device.

In some embodiments a credential may include a temporal attribute. Temporal attribute may include, without limitation, a secure timestamp indicating the time that the credential was created, a monotonic counter value or other datum unique to the credential for this particular requesting device 140 and/or a set of devices, and/or a session key conferring access to the network at the time of credential and/or token creation. Additionally or separately, temporal attribute and/or credential may include an expiration period, e.g. a fixed time limit relative to authenticating device 104 and/or a cryptographic evaluator's local time the credential was created or issued, and may include at least a trust level based upon the properties of the requesting device 140 attested in the authorization process, as described herein. It may be desirous to separately or additionally provide at least a session key enabling requesting device 140 to encrypt and/or decrypt messages to at least a second requesting device 140, or at least a group of devices, based on properties of commonality between devices. In non-limiting example, session key may be a symmetric key conveyed via secure channel from the at least a cryptographic evaluator 112, and/or an asymmetric key, multisignature, threshold signature or key system resulting from multi-signature or threshold signature as described above, or other key system or datum associated with at least a cryptographic evaluator 112 during at least a time epoch. The foregoing may be signed in whole or in part, or any logical combination, by at least a cryptographic evaluator 112. In an embodiment, at least a cryptographic evaluator 112 may share via secure channel a copy of or subset of temporally sequential listing 120, and additional parameters including at least a secret, in order for the requesting device 140 to evaluate credentials of another device as being contained or represented in the temporally sequential listing 120.

In an alternative or additional embodiment, a credential may be created via blind signatures. In a representative embodiment of blind signature-based credential, the at least a requesting device 140 wishing to receive a credential and/or access right may generate multiple different lease certificates. At least a requesting device 140 may encrypt all or the majority of lease certificates and communicate them to at least a cryptographic evaluator 112. At least a cryptographic evaluator 112 may select one or more certificates at random. At least a requesting device 140 may further provide decryption keys to all but one or more certificates. At least a cryptographic evaluator 112 may evaluate at least one of the certificates to which the at least a cryptographic evaluator 112 has been given decryption keys. If at least a cryptographic evaluator 112 deems that the certificates, based on information obtainable, are authentic, then the verifier blindly signs the one or more certificates for which the verifier does not have a key, and communicates this to requesting device 140 for use as at least an authorization certificate, as described herein.

At step 515, and still referring to FIG. 5, authenticating device 104 validates the credential, as a function of the at least a second digitally signed assertion. As used herein, validating the credential means determining that the credential is currently valid, based on the at least a second digitally signed assertion and/or on the evaluation of the at least a second digitally signed assertion. Where credential confers a right to perform an action as described above, validation may include confirmation that the credential is currently conferring that right to perform that action. Validation may include, without limitation, determining a confidence level in the at least a cryptographic evaluator; this may be performed, without limitation, as described above in reference to FIGS. 1-4. Authenticating device 104 may validate the credential as a function of the confidence level; for instance, and as described in further detail above in reference to FIGS. 1-4, authenticating device 104 may compare a confidence level in and/or associated with credential to a threshold. Authenticating device may, in a non-limiting example, determine an aggregate confidence level in the plurality of cryptographic evaluators, such as a plurality of cryptographic evaluators signing credential as described above, compare the aggregate confidence level to a validation threshold, and validate the credential as a function of the determination; this may be performed, without limitation, as described above in reference to FIGS. 1-4. Authenticating device 104 may alternatively or additionally determine that credential is not valid, where credential fails one or more tests, comparisons, or the like as described in this disclosure for validating credential; for instance, where a confidence level as described above does not meet a threshold, authenticating device 104 may determine that credential is not valid, and deny requesting device 140 ability to perform a requested action as described above.

In an embodiment, and with continued reference to FIG. 5, authenticating device 104 may validate credential as a function of and/or based on a temporal attribute as described above. For instance, and without limitation, where credential includes an expiration period, validation may include determining that the credential is current, based on the expiration period; that is, validation may include determining that the credential and/or temporal attribute thereof has not expired.

Still referring to FIG. 5, validation may include determining that credential is not on a revocation list 144 as described above. Inclusion of credential on revocation list may include inclusion of credential itself on revocation list 144, inclusion of a verification datum associated with first digitally signed assertion and/or credential on revocation list 144, inclusion of a subset of credentials and/or a set of credentials sharing and/or linked to a common datum, or the like. In an embodiment, where revocation list 144 includes one or more sub-lists 148, determining that credential is not on revocation list may include identifying at least a sub-list 148 corresponding to credential and determining that credential is not on sub-list 148; for instance, and without limitation, where a temporal attribute of credential associates credential with a particular epoch, time-period, expiration time, or the like, authentication device 104 may search for listing of credential in a sub-list 148 associated with that particular epoch, time-period, expiration time, or the like. As a further non-limiting example, where credential, first digitally signed assertion, and/or verification datum is associated with a cohort or collection of credentials, devices, or the like sharing a common datum, authentication device 104 may search for a listing of credential in a sub-list 148 associated with the common datum, cohort, and/or collection. As a further example, where revocation list 144 includes a sub-list 148 for malicious actors or the like, authenticating device 104 may check that sub-list 148 in addition to or alternatively to other sub-lists 148.

With continued reference to FIG. 5, in an embodiment, where credential is listed in revocation list 144, authenticating device 104 may deny a request from requesting device 140. In an embodiment, authenticating device 104 may initiate a secondary authentication request; this may, without limitation, cause one or more cryptographic evaluators to perform a step or combination of steps as described in this disclosure to authenticate requesting device 140 and/or a digitally signed assertion therefrom. Alternatively or additionally, authenticating device 104 may transmit to requesting device 140 a notification that a request is denied. Authenticating device 104 may take no action upon rejection of request.

Alternatively or additionally, and with continued reference to FIG. 5, revocation may be implied by rejection of renewal requests as described in further detail below; in other words, authenticating device 104 and/or a cryptographic evaluator 112 may have determined that requesting device and/or a device associated with credential, first digitally signed assertion, and/or verification datum should have one or more rights to perform actions as described above revoked, and may deny a renewal request. Authentication device 104 may therefore determine that requesting device 104 and/or devices associated with credential, verification datum, and/or first digitally signed assertion have had such rights to perform actions revoked, based on expiration of previous and/or currently presented credential without renewal.

At step 520, and still referring to FIG. 5, authenticating device 104 authenticates the requesting device 140 based on the credential. Authentication, as used in reference to method 500 signifies determination that requesting device 140 is authorized to perform requested action, based on a validated credential. Authentication may include, without limitation, comparison of a right to perform action in credential to a requested action; in an embodiment this may be accomplished by comparing a list of authorized actions in and/or linked to credential, for instance via a Merkel tree and/or URL, to a requested action. Alternatively or additionally, credential may identify a scope of authorization, defined for the purposes of this disclosure as a range of actions that are authorized by credential; range may include, as a non-limiting example, access levels and/or categories of actions that are permitted. For instance, a first and lower security level may be required for authorization to receive an element of data that is not considered confidential from authenticating device 104 and/or memory accessible to authenticating device, while a second and higher security level may be required for authorization to received confidential data, such as personal identifying data, medical data, and/or financial account data, from authenticating device 104; a third security level, which may be higher than first and/or second security level, may correspond to a right to execute an application on authenticating device 104. As a non-limiting example, where receiving at least a first digitally signed assertion includes receiving an authorization request to execute an application, authentication may include determining that scope of authorization includes the application and/or a right to execute the application on authenticating device 104 and/or another device. In an embodiment, system 100, cryptographic evaluators 112, and/or authentication device 104 may set of a policy for network level credentials; network level credentials may confer access rights to or within a network administered and/or secured by system 100. As an additional example, system 100, cryptographic evaluators 112, and/or authenticating device 104 may set and/or enforce an application service level policy establishing rights of one or more devices to execute and/or perform one or more applications. Authentication may include determination, by authenticating device 104, that credential meets and/or satisfies a network policy and/or application service level policy.

Alternatively or additionally, and still referring to FIG. 5, where credential confers a confidence level on requesting device 140 or otherwise contains a confidence level determination, authenticating device 104 may compare confidence level to a threshold, and authenticate or reject authentication based on the comparison; this may be performed, without limitation, as described above in reference to FIGS. 1-4. Authenticating device 104 may determine a confidence level in requesting device 140, in first digitally signed assertion, in credential, and/or in a cohort or lot of devices associated with credential, first digitally signed assertion, and/or verification datum; determination of confidence level may include any steps and/or processes as described above for determination and/or assignment of confidence level. Authenticating device 104 may compare determined confidence level to a threshold and authenticate requesting device 140 if the determined confidence level exceeds or passes the threshold.

With continued reference to FIG. 5, authenticating device 104 may generate a new credential; for instance, where request includes a credential renewal request, upon successful authentication, authenticating device 104 may generate a credential having a new temporal attribute. In an embodiment, temporal attribute may include any temporal attribute as described above. For instance and without limitation, temporal attribute may have a new expiration time that is in the future, granting a new period of authorization for requesting device 140. Temporal attribute may be received from temporally sequential listing and/or one or more cryptographic evaluators 112; for instance, system 100 and/or cryptographic evaluators may select or establish epochs or periods within which a plurality of credentials are valid, as described above, and authenticating device 104 may include in or associate with new credential a temporal attribute placing new credential in the plurality of credentials associated with such an epoch. Authenticating device 104 may post new credential to temporally sequential listing 120; in an embodiment, authenticating device, a cryptographic evaluator, and/or a plurality of cryptographic evaluators 112 may sign new credential and/or post new credential separately. In an embodiment, where requesting device 104 fails authentication, authenticating device 104 may reject credential renewal request; this may function as a form of revocation by non-renewal, which may obviate a need to consult revocation list in an embodiment.

Still referring to FIG. 5, in an embodiment authenticating device 104 initiates a secondary authentication request; this may be performed as part of authentication as described above, or subsequent to authentication. As a non-limiting example, request from requesting device 140 may include a request to perform an action that requires a high access level, such as a financial transaction, a transfer of confidential data, or the like. In an embodiment, credential may confer a lower access level, and secondary authentication may be used to determine whether requesting device 140 should receive a higher access level, such as an access level sufficient to perform a requested action. Where secondary authentication is successful, authenticating device 104 and/or at least a cryptographic evaluator 112 may generate and/or post to temporally sequential listing a modification to credential and/or a new credential granting a higher access level to requesting device 140 and/or a cohort of devices including requesting device 140. Alternatively or additionally, system 100 may enforce a rule and/or protocol whereby certain actions necessarily require a secondary authentication, regardless of listed access levels for a given credential; thus, after authentication as described above, authenticating device 104 may generate a secondary authentication request prior to granting a request to perform such an action. Secondary authentication request may include a request for a confidence level determination as described above. Alternatively or additionally, secondary authentication request may include a request to "unmask" requesting device 140, where "unmasking" is a process reducing a degree of anonymity enjoyed by requesting device 140, as described in further detail below.

In an embodiment, and continuing to refer to FIG. 5, authenticating device 104 may select at least a cryptographic evaluator to perform secondary authentication. Selection may be performed according to any process described above for selection of at least a cryptographic evaluator to perform an authentication step. Selection may include selection of at least a cryptographic evaluator using a random oracle as described above. Authenticating device 104 may transmit, to a cryptographic evaluator, including without limitation a cryptographic evaluator selected as described above, a secondary authentication request. Transmission may be effected according to any process and/or process step as described in this disclosure.

Still referring to FIG. 5, authenticating device 104 may receive a secondary authentication response from at least a cryptographic evaluator. Secondary authentication response may include, without limitation, a determination of an access level. Secondary authentication response may include, without limitation, at least a confidence level; authenticating device 104 may compare the at least a confidence level to a threshold, and assign a higher access level and/or grant a request based on the comparison; determination of at least a confidence level and/or authentication based on at least a confidence level may be performed, without limitation, as described above in reference to FIGS. 1-4.

Alternatively or additionally, authenticating device 104 may receive from the cryptographic evaluator 112 or evaluators an unmasking output, which may include any identifier reducing the anonymity of requesting device. For instance, in an embodiment authenticating device 104 may receive an identifier of the requesting device from a cryptographic evaluator 112; identifier may be an identifier linked to hardware on requesting device 104 such as a secure computing module 124, TPM 128, and/or component thereof. For instance, at least a cryptographic evaluator 112 may have performed verification of a manufacturer or other device signature of a verification datum linked to device identifier, including without limitation a device-specific public key and/or verification datum or a group public key and/or verification datum as described above. For instance, at least a cryptographic evaluator 112 may evaluate a manufacturer signature of a group public key purportedly connected to requesting device 104 and evaluate a secure proof generated by requesting device 104 using related secret and/or private key. In such an embodiment, an unmasking output may include an output providing a verification datum linked to device identifier by manufacturer. This may decrease anonymity and increase security by associating requesting device 140 with a particular manufacturer and/or set of devices produced thereby; manufacturer may have additional revocation lists to which such a verification datum may be compared to further evaluate reliability of requesting device 140. Alternatively or additionally, a verification datum and/or identifier directly linked to and/or installed on hardware of a particular requesting device 140 may enable authenticating device 104 to determine an entity operating requesting device 140 and/or to examine temporally sequential listing 120 or other records for transaction histories and past determinations linked to the particular requesting device 140. In an embodiment, a cryptographic evaluator 112 that participated in issuing credential may retain data used to determine whether to issue the credential; such data may include any data suitable for use in an unmasking output as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
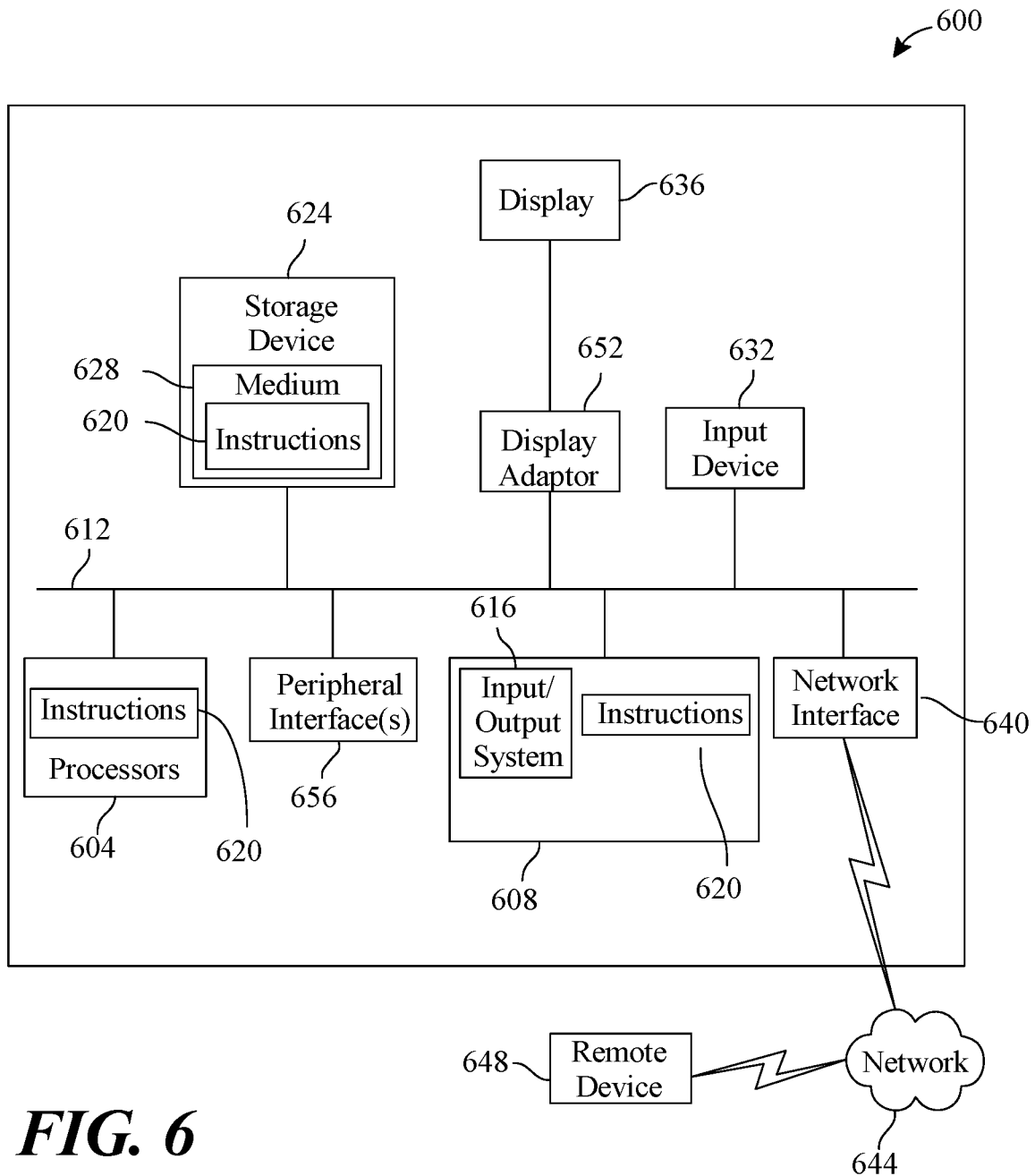
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of authenticating a requesting device using verified evaluators, the method comprising:
    receiving, by an authenticating device, at least a first digitally signed assertion from a requesting device, the at least a first digitally signed assertion linked to at least a verification datum, wherein the at least a first digitally signed assertion is included in a temporally sequential listing comprising access privileges established by a confidence level and existing on a plurality of access levels, wherein the access privileges are generated by:
    providing a first access level with readable access to a first set of entities, and a second access level with readable and writeable access to a second set of entities;
    evaluating, by the authenticating device, at least a second digitally signed assertion, signed by at least a cryptographic evaluator, conferring a credential to the requesting device;
    validating, by the authenticating device, the credential as a function of the at least a second digitally signed assertion;
    wherein validating further comprises:
    determining a confidence level in the at least a cryptographic evaluator; and
    validating the credential as a function of the confidence level;
    and authenticating, by the authenticating device, the requesting device based on the credential.

2. The method of claim 1, wherein receiving further comprises receiving a credential renewal request.

3. The method of claim 2 further comprising generating a new credential as a function of credential.

4. The method of claim 3 further comprising posting the new credential to a temporally sequential listing.

5. The method of claim 1, wherein the second digitally signed assertion includes a plurality of digitally signed assertions generated by a plurality of cryptographic evaluators.

6. The method of claim 5, wherein validation further comprises:
    determining an aggregate confidence level in the plurality of cryptographic evaluators;
    comparing the aggregate confidence level to a validation threshold; and
    validating the credential as a function of the determination.

7. The method of claim 1, wherein:
    the credential includes an expiration period; and
    validation further comprises determining that the credential is current, based on the expiration period.

8. The method of claim 1, wherein validation further comprises determining that the credential is not on a revocation list.

9. The method of claim 1 further comprising transmitting, to a cryptographic evaluator, a secondary authentication request.

10. The method of claim 9 further comprising receiving, from the cryptographic evaluator, an identifier of the requesting device.

11. The method of claim 1 further comprising determining a scope of authorization based on the credential.

12. The method of claim 11, wherein
    receiving the at least a first digitally signed assertion further comprises receiving an authorization request to execute an application; and
    authentication further comprises determining that the scope of authorization includes the application.

13. A system for authenticating a requesting device using verified evaluators, the system comprising:
    an authenticating device, wherein the authenticating device comprises one or more computing devices designed and configured to receive at least a first digitally signed assertion from a requesting device, the at least a first digitally signed assertion linked to at least a verification datum,
    wherein the at least a first digitally signed assertion is included in a temporally sequential listing comprising access privileges established by a confidence level and existing on a plurality of access levels, wherein the access privileges are generated by:
    providing a first access level with readable access to a first set of entities, and a second access level with readable and writeable access to a second set of entities;
    evaluate at least a second digitally signed assertion, signed by at least a cryptographic evaluator, conferring a credential to the requesting device,
    validate the credential, as a function of the at least a second digitally signed assertion,
    wherein validating further comprises: determining a confidence level in the at least a cryptographic evaluator; and validating the credential as a function of the confidence level;
    and authenticate the requesting device based on the credential.

14. The system of claim 13, wherein the authenticating device is further configured to receive a credential renewal request.

15. The system of claim 13, wherein the second digitally signed assertion includes a plurality of digitally signed assertions generated by a plurality of cryptographic evaluators.

16. The system of claim 13, wherein:
    the credential includes an expiration period; and
    validation further comprises determining that the credential is current, based on the expiration period.

17. The system of claim 13, wherein the authenticating device is further configured to transmit, to a cryptographic evaluator, a secondary authentication request.

18. The system of claim 17 wherein the authenticating device is further configured to receive, from the cryptographic evaluator, an identifier of the requesting device.

19. The system of claim 1 wherein the authenticating device is further configured to determine a scope of authorization based on the credential.

* * * * *